US008064128B2

(12) United States Patent
Mattsson et al.

(10) Patent No.: US 8,064,128 B2
(45) Date of Patent: Nov. 22, 2011

(54) DEEP BLUE EXTENDED SUPER CONTINUUM LIGHT SOURCE

(75) Inventors: Kent Mattsson, Virum (DK); Michael Henoch Frosz, Taastrup (DK)

(73) Assignee: NKT Photonics A/S, Birkerod (DK)

( * ) Notice: Subject to any disclaimer, the term of this patent is extended or adjusted under 35 U.S.C. 154(b) by 0 days.

(21) Appl. No.: 12/528,059

(22) PCT Filed: Dec. 10, 2007

(86) PCT No.: PCT/DK2007/000540
§ 371 (c)(1),
(2), (4) Date: Aug. 20, 2009

(87) PCT Pub. No.: WO2008/067823
PCT Pub. Date: Jun. 12, 2008

(65) Prior Publication Data
US 2010/0172018 A1 Jul. 8, 2010

Related U.S. Application Data

(60) Provisional application No. 60/869,192, filed on Dec. 8, 2006.

(30) Foreign Application Priority Data

Dec. 8, 2006 (DK) .................................. 2006 01620

(51) Int. Cl.
*G02F 2/02* (2006.01)
*H01S 3/10* (2006.01)
(52) U.S. Cl. ................ 359/326; 385/122; 372/6; 372/23
(58) Field of Classification Search .......... 359/326–329; 385/122; 372/6, 23
See application file for complete search history.

(56) References Cited

U.S. PATENT DOCUMENTS 6,097,870 A 8/2000 Ranka et al.
(Continued)

FOREIGN PATENT DOCUMENTS

EP 1502332 B1 3/2006
(Continued)

OTHER PUBLICATIONS

M.H. Frosz, T. Sörensen, O. Bang: "Nanoengineering of photonic crystal fibers for continuum spectral shaping"; Journ. Optical Society of America, vol. 23, No. 8, Aug. 2006, pp. 1692-1699, p. 1697, figs. 1, 7-9.

(Continued)

*Primary Examiner* — Hemang Sanghavi
(74) *Attorney, Agent, or Firm* — Buchanan Ingersoll & Rooney PC

(57) ABSTRACT

A new deep blue extended super continuum light source is provided wherein said super continuum at least extends to a low wavelength border $\lambda_{low}$ low below 480 nm comprising a pump source which operates at a at least one wavelength $\lambda_{pump}$ and produces pump pulses of a duration (full width half maximum) longer than 0.1 picoseconds with a repetition rate higher than 1 MHz, and a peak power $\lambda_{peak}$, and a microstructured optical transmission medium having at least one wavelength of zero dispersion $\lambda_{zero}$, and for the parameters for said pump source exhibiting a second order dispersion parameter $\beta_2$, and a non-linear parameter $\lambda$ arranged so that the optical transmission medium exhibits a modulation instability gain extending to wavelengths above a wavelength $\lambda_{high} \geq 1300$ nm and a phase match between $\lambda 1_{ow}$ and a wavelength $\lambda_{match} \geq \lambda_{high}$, wherein the pump is adapted to provide energy within the region of anomalous dispersion of the transmission medium.

51 Claims, 11 Drawing Sheets

U.S. PATENT DOCUMENTS

| | | |
|---|---|---|
| 6,954,574 B1 | 10/2005 | Russell et al. |
| 2002/0061176 A1 | 5/2002 | Libori et al. |
| 2004/0052484 A1 | 3/2004 | Broeng et al. |
| 2005/0069269 A1 | 3/2005 | Libori et al. |
| 2005/0117841 A1* | 6/2005 | Braun et al. ............... 385/27 |
| 2005/0238307 A1 | 10/2005 | Hansen et al. |
| 2005/0265405 A1 | 12/2005 | Mannstadt et al. |
| 2006/0159398 A1 | 7/2006 | Knox |
| 2006/0291789 A1 | 12/2006 | Folkenberg et al. |
| 2007/0216989 A1* | 9/2007 | Nerin et al. ............... 359/326 |
| 2008/0226242 A1* | 9/2008 | Buchter et al. ............ 385/122 |
| 2009/0074023 A1 | 3/2009 | Wadsworth |
| 2009/0262764 A1 | 10/2009 | Mattson |

FOREIGN PATENT DOCUMENTS

| | | |
|---|---|---|
| WO | WO 00/49436 A1 | 8/2000 |
| WO | WO 02/12931 A2 | 2/2002 |
| WO | WO 02/39159 A1 | 5/2002 |
| WO | WO 02/084350 A1 | 10/2002 |
| WO | WO 02/088801 A2 | 11/2002 |
| WO | WO 03/079074 A1 | 9/2003 |
| WO | WO 2005/059612 A1 | 6/2005 |
| WO | WO 2005/062113 A1 | 7/2005 |
| WO | WO 2006/066093 A2 | 6/2006 |
| WO | WO 2007/006316 A2 | 1/2007 |

OTHER PUBLICATIONS

Ranka et al.,"Visible Continuum Generation in Air-Silica Microstructure Optical Fibers with Anomalous Dispersion at 800 nm", Optics Letters, vol. 25, No. 1, (2000), pp. 25-27.

J. Herrmann et al., "Experimental Evidence for Supercontinuum Generation by Fission of Higher-Order Solitons in Photonic Fibers", Phys. Rev. Letters, vol. 88, No. 17, 2002.

S. Coen et al., "White-Light Supercontinuum Generation with 60-ps Pump Pulses in a Photonic Crystal Fiber", Optics Letters, vol. 26, (2001), pp. 1356-1358.

G.E.Town et al., "Optical Supercontinuum Generation from Nanosecond Pump Pulses in an Irregularly Microstructured Air-Silica Optical Fiber", Applied Physics B (Lasers and Optics), vol. B77, No. 2-3, Sep. 2003, pp. 235-238.

Kudlinski et al., "Zero-Dispersion Wavelength Decreasing Photonic Crystal Fibers for Ultraviolet-Extended Supercontinuum Generation", Optics Express, vol. 14, No. 12, Jun. 12, 2006, pp. 5715-5722.

J.Price et al., Soliton Transmission and Supercontinuum Generation in Holey Fiber, Using a Diode Pumped Ytterbium Fiber Source, Optics Express vol. 10, No. 8, Mar. 20, 2002, p. 382-387.

D.V.Skryabin et al., "Soliton Self-Frequency Shift Cancellation in Photonic Crystal Fibers", Science, vol. 30, Sep. 19, 2003, pp. 1705-1708.

T.A. Birks et al., "Endlessly Single-Mode Photonic Crystal Fiber", Optics Letters, vol. 22, 1997, pp. 961-963.

Bjarklev et al, "Photonic Crystal Fibres", Kluwer Academic Press, 2003.

Andersen et al. A Photonic Crystal Fiber With Zero Dispersion at 1064 nm, ECOC 2002, Novel Fibres 3.4.2.

T. Schreiber et al.; "High Average Power Supercontinuum Generation in Photonic Crystal Fibers", Elsevier B.V.; Optics Communications 228 (2003); pp. 71-78.

* cited by examiner

DEEP BLUE EXTENDED SUPER CONTINUUM LIGHT SOURCE

TECHNICAL FIELD OF THE INVENTION

The invention relates to the field of super continuum light generation in micro-structured fibres. In particular, this invention relates to a super continuum source configured to produce light within a selectable bandwidth blue shifted relative to the pump wavelength in micro-structured fibres by trains of Terahertz repetition rate pulses launched near the zero dispersion wavelength of the micro-structured fibre.

BACKGROUND OF THE INVENTION

Super continuum (SC) generation is a nonlinear phenomenon characterised by dramatic spectral broadening of intense light pulses passing through a nonlinear material. SC generation occurs in various media and finds use in numerous applications ranging from spectroscopy to ultra-short-pulse generation. Inter alea, optical radar and ranging (LIDAR), spectroscopy, optical computing, and reaction rate studies. Spectral slicing of the generated SC in order to replace several discrete light sources is one main mean to design such multi wavelength optical sources.

The newly developed micro structured fibres (MF) possess unique optical properties which allow generating SC with a broader bandwidth than what is possible in bulk silica or in standard optical fibres. Since the first report on SC generation in a MF in 1999 by Ranka et al. (Optics Letters, Vol. 25, No. 1, (2000), pp. 25-27) comprehensive efforts have been made to understand the physical mechanisms leading to the generation of light with a broad spectrum in this type of fibres, and an extensive literature has been published on the subject. The bulk part of these studies utilises femto-second pulses ($10^{-15}$ s) to generate the SC. The physical mechanism responsible for the SC generation is believed to be the creation and fission of higher order solutions according to J. Herrmann et al., Phys. Rev. Letters, Vol. 88, No 17, 2002. It has also been shown that it is possible to create SC by use of pico- and nanosecond pulses, and the mechanism responsible for these SCs are believed to be a combination of four wave mixing and stimulated Raman scattering (Coen et al., Optics Letters, Vol. 26, (2001), pp. 1356-1358, and Town et al. Applied Physics B (Lasers and Optics), Vol. B77, No. 2-3, September 2003, pp. 235-238). The possibility of tailoring the properties of MFs for improving the efficiency of SC light generation using pico- or nanosecond pulses has, however, been little explored. The use of longer pulses is, however, attractive as it does not require an often complex and expensive femto second laser. This has so far been a main obstacle to the creation of commercially viable SC light sources.

The spectral slicing of a SC only utilizes a small part of the spectrum and there only a small part of the launched energy. The energy in the SC is often symmetrically distributed around the pump and primarily generated through a four wave mixing process or alternatively red shifted relative to the pump when stimulated Raman scattering dominates the generation process in the case of inefficient phase matching of the four wave mixing process. The hereby generated blue light will be limited to the half pump wavelength due to energy conservation of the four wave mixing process. Here the blue shifted light (idler) is generated through the action of two pump photons and a red shifted (signal) photon. The idler wavelength generated through the four wave mixing process is determined through the conservation of energy equation: $h\nu_{\textit{idler}} = 2h\nu_{pump} - h\nu_{signal} \Longleftrightarrow 1/\lambda_{\textit{idler}} = 2/\lambda_{pump} - 1/\lambda_{signal}$, where $\nu$ and $\lambda$ denote frequency and wavelength, respectively, and h is Planck's constant. For the hypothetic situation of the infrared part of the SC extending to infinity the idler wavelength minimum is to be found at the half pump wavelength.

In prior art SC from Kudlinski et al. Optics Express, Vol. 14, No. 12, 12 Jun. 2006, pp. 5715-5722 a blue extended spectrum with a flat (3 dB) spectrum from 395 nm to 850 nm, with a minimum spectral power density of 2 mW/nm (3 dBm) was achieved in a configuration with a total continuum output power of 3.5 W. The shortest wavelengths were generated by cascaded four-wave mixing: the continuous decrease of the zero dispersion wavelength along the fibre length enables the phase-matching condition to be satisfied for a wide range of wavelengths into the ultraviolet, while simultaneously increasing the nonlinear coefficient of the fibre. The manufacturing process involved in the continuous decrease of the zero dispersion wavelength along the fibre is likely difficult.

In prior art SCs shown in FIG. 1 for a 100 femto second pulse generated spectrum and in FIG. 2 for a 60 ps pulse generated spectrum there is no significant light generated below the half pump wavelength. In prior art SC from European patent application EP 1502332 by Braun and Bertram shown in FIG. 4 for a 8.5 ps 5.8 kW pulse generated spectrum light is not generated below the half pump wavelength either. This spectrum shows power intensity of the red shifted part that is equal to or smaller than the power intensity of the blue shifted part contrary to the SCs of FIG. 1 and FIG. 2. This indicates that the light is generated through another process than four wave mixing. The generated spectrum shows in the blue part a spectral density of −25 dBm/nm.

In prior art SC from Price et al. (Optics Express, Vol. 10, No. 8, Mar. 20 2002, pp. 382-387) shown in FIG. 5, a blue extended spectrum with −10 dBm/nm output power in the blue part of the spectrum for a single excitation pulse of 21 kW peak power and 350 fs duration launched into a micro-structured fibre with a 1.6 μm core diameter is shown.

Thus, there is a need for a light source providing a spectrum extending into the blue and ultraviolet part of the spectrum with a spectral density exceeding −10 dBm/nm produced in a conventional fibre design which can be manufactured on a standard drawing tower.

SUMMARY OF THE INVENTION

In the following a new method for generating light is presented. This method can advantageously be applied to yield a new SC source that can be managed to have a substantial part of its output in the UV, visible or near infrared.

As the method to some extend is derived from theoretic considerations which may be simplified for clarity equations are generally considered to be approximations to the real-world. Furthermore, prior art theoretic understanding of SC generation accepted in the field, as well as new knowledge presented in this application, is based on the theoretic explanations in best correspondence with experimental results and/or most convincing speculations or similar indications of validity. The present invention is based on groundbreaking theoretic considerations which represents the current best understanding of the underlying principles of SC generation. As the field of SC generation is a topic of extensive research new theoretic models may emerge providing alternative explanations for the underlying mechanisms. However, theoretic considerations as well as accompanying equations presented in this text are intended illustrate the principles of the invention and improve understanding of the underlying mechanisms of the invention as well as SC generations but are not intended to be interpreted to limit the scope of the invention as defined by the accompanying set of claims.

As the emission from a pulsed pump source with substantially constant pulse peak amplitude propagates through a dispersive medium, it may undergo amplitude modulation, with the modulation depth growing exponentially with time, provided that the pump wavelength lies in a region of anomalous dispersion of the transmission medium. This amplitude modulation means that part of the energy in the pump has been shifted into sidebands, in some instances such sidebands may be referred to as stokes- and anti-stokes lines. The generated sidebands are the result of modulation instability gain that exists near the pump frequency. The modulation instability gain holds maxima at the angular frequencies $\Omega_{max}$ determined by:

$$\Omega_{Max} = \pm \sqrt{\frac{2\gamma P_{Peak}}{|\beta_2|}} \quad (1)$$

where $\gamma$, $P_{peak}$ and $\beta_2$ are explained below. Upon launch of the high peak power pulse into the transmission medium (e.g. a micro-structured fibre), sidebands develop from the background radiation noise floor. This is most effective at the maximum frequencies determined by equation 1. The pulse train corresponding to the sideband may be assumed to comprise Gaussian shaped pulses which upon propagation may likely revolve into such-shaped fundamental solutions due to the stability of this solution. A signal with repetition of the original spectrum is arises once the power in the sidebands holds a peak power corresponding to substantially 5% (such as e.g. 1% to 10% or 3% to 7%) of the peak power of the (soliton) pulse. This soliton pulse is the result of a pulse corresponding to the sidebands propagating. Alternatively, one may view the effect such that a signal with repetition of the original spectrum is given once the power in the sidebands holds a peak power corresponding to substantially 5% (such as e.g. 1% to 10% or 3% to 7%) of the peak power of the (soliton) pulse that fits into the repetition rate frame determined by $\Omega_{max}/2\pi$. Once the peak power in the sidebands reaches this value, the nonlinear phase shift of the soliton fits into the repetition rate frame and a terahertz repetition rate train is created. The soliton pulse duration $T_0$ is determined by $T_{FWHM}/1.76$ (where the 1.76 originates from the sech$^2$ shape of optical the solutions predicted theoretically) and the nonlinear phase fits into the repetition rate frame once the soliton duration becomes $\pi/\Omega_{max}$. This leads to the condition for pulse train formation $T_{FWHM}=0.88\ 2\pi/\Omega_{max}=0.88\ T_m$, where $T_m$ is the repetition time within the terahertz pulse train. I.e. a terahertz pulse train develops once the peak power in the sidebands is around (assuming a 5% limit):

$$P_{SB} = \frac{\beta_2}{\gamma 20(0.88 \cdot T_m)^2} \quad (2)$$

Here the second order dispersion parameter $\beta_2=-\lambda^2/(2\pi c)D$, where $D=d/d\lambda(1/v_g)$ is the group velocity dispersion and $v_g$ is the group velocity, and c is the speed of light in vacuum, and $\gamma$ is the nonlinear parameter given by mutation 3:

$$\gamma = \frac{2\pi n_2}{\lambda A_{eff}} \quad (3)$$

Here $n_2$ is the nonlinear refractive index of the fibre material and $A_{eff}$ is the effective mode area of the fibre.

Once the terahertz pulse train is created the individual solitons of the pulse train may experience soliton self frequency shifting due to Raman gain of the glass material. The soliton self frequency shift $\Omega(z)$ at a distance z is given for the fundamental soliton by equation 4 approximated from:

$$\frac{d\omega}{dz} = -\frac{8}{15} \frac{T_R|\beta_2|}{T_0^4} \Rightarrow$$

where $\omega$ is frequency of the optical wave.

$$\Omega(z) = -\frac{T_R|\beta_2|}{2T_0^4}z \quad (4)$$

Here $T_R$ is the Raman parameter—with a relaxation time in the 0.5-5 fs range. The self frequency shifting distance $L_{SSFS}$ is directly to be obtained from equation 8 for a $\Delta\nu$ self frequency shift through $L_{SSFS}=4\pi T_0^4\Delta\nu/(-T_R|\beta_2|)$, where $T_0$ is the soliton pulse duration.

The self frequency shifting may shift the solitons through the modulation instability in their travel towards the infrared. This may cause the individual solitons of the train to gain energy. The largest extension of the modulation instability gain and hereby the largest amplification of the solitons is expected when the launched pump pulse holds a wavelength close to the zero dispersion wavelength of the applied fibre. To avoid a too large loss of pump energy into the normal dispersion region of the fibre the pump wavelength is preferably placed at a small distance to the zero dispersion wavelength in the anomalous dispersion region. This is preferably done in a manner where the self phase modulation (SPM, the Kerr effect) of the launched energy only shifts a minor part of the energy into the normal dispersion regime of the fibre. The energy shifted into the normal dispersion regime of the fibre is likely lost for the gain process. Typically the pump wavelength may be chosen 2-3 nm above the fibre zero dispersion wavelength when a 10 kW peak power pulse is launched into the micro-structured fibre.

The soliton pulses maintain their temporal response due to the interplay between self phase modulation (SPM, the Kerr effect) and anomalous dispersion of the fibre. I.e. the dispersion length of the fibre $L_D=T_0^2/\beta_2$ is comparable in size to the nonlinear length $L_{NL}=1/(\gamma P_{peak})$ of the fibre. The self phase modulation generates a frequency chirp such that the leading edge of the soliton is red-shifted while its tailing edge is blue shifted from the central frequency. The anomalous dispersion contracts the pulse as the pulse is positively chirped by the SPM. These two effects will for certain pulse durations and peak power levels balance each other out and a soliton is created. The soliton order number N is determined by equation 5:

$$N = \sqrt{\frac{L_D}{L_{NL}}} = \sqrt{\frac{P_{soliton}\gamma T_0^2}{\beta_2}} \approx \sqrt{\frac{P_{Peak}\gamma T_0^2}{\beta_2}} \quad (5)$$

Here $P_{soliton}$ is the peak power of the soliton pulse which may be approximated, at least initially in its propagation, by $P_{peak}$ being the launched peak power, $T_0$ is the soliton duration (which is equal to $T_{FWHM}/1.76$, where $T_{FWHM}$ is the Full Width Half Maximum duration for a sech-pulse). The solitons within the pulse train will most likely have $N \approx 1$, i.e. remain fundamental solitons when they gain energy on their travel through the modulation instability gain. The energy of the individual solitons is given by $E = P_{Peak}T_0$ and with a travelled fibre path length $L_{SSFS}$ to incur a self frequency shift $\Delta v$ in frequency. The energy gain from the modulation instability gain and loss of energy to radiation and propagation is given by $\alpha$ (m$^{-1}$). The energy condition for a $\Delta v$ self frequency shift leads to the soliton duration and peak power of the self frequency shifted soliton given by:

$$E_{after} = E_{before} \cdot \exp(-\alpha \cdot L_{SSFS}) \Leftrightarrow \quad (6)$$

$$T_{0,after} = \frac{\gamma_{before} \cdot \beta_{2,after}}{\gamma_{after} \cdot \beta_{2,before}} \cdot T_{0,before} \cdot \exp(\alpha \cdot L_{SSFS}) \wedge P_{after}$$

$$= \frac{\beta_{2,after}}{\gamma_{after} \cdot T_{0,after}^2}$$

The generated spectrum from a terahertz repetition rate soliton pulse train is due to radiation generated by the individual solitons of the pulse train. The solitons of the terahertz repetition rate pulse train may be regarded as relativistic particles ("light bullets") travelling through the glass fibre with a given speed (group velocity). In the context of this text the term light bullet is used interchangeably with the soliton and is to be confused with a common application of the term designating 3D solitons. In the soliton group velocity exceeds the group velocity at a wavelength that holds phase match with the soliton central wavelength, a dispersive wave is created. Explained in another way the electrons in the glass are displaced and polarized by the passing soliton pulse photons. Some of the glass molecule electrons are excited to states above their ground state by several photon excitations of a single electrons. If an electron is excited by more than one photon within half a Bohr orbit time $\approx 70$ atto seconds (1 as=$10^{-18}$ s), the collective action of the multiple photon corresponds to the response of a single photon of energy equal to the multiple photons. The energy may re-emit as the electrons in the glass restore to equilibrium during and after the soliton pulse has passed. Under normal circumstances the re-emitted photons destructively interfere with each other and no radiation is detected. Where the soliton pulse travels faster than the re-emitted photons of the local high energy photons, the re-emitted photons may constructively interfere and intensify if phase match is achieved. The result is radiation at frequencies that may be well beyond the soliton spectrum. The radiation is produced under conditions that resemble Cherenkov radiation known from high kinetic energy electrons emitted from nuclear reactors. The light bullets may generate radiation if phase match between a dissipative mode in the UV or blue part of the spectrum exists for the given micro-structured fibre medium. The phase match $\Delta\kappa=0$ is determined by equation 7:

$$\Delta\kappa = \beta(\omega_{Rad}) - (\beta(\omega_{Raman}) + \gamma P_0) \quad (7)$$

where $\beta(\omega_{Rad})$ and $\beta(\omega_{Raman})$ are the phase of the generated radiation and a Raman soliton with peak power $P_0$, respectively, and $\gamma$ is the nonlinear parameter defined in equation (3). The term Raman soliton refers to a soliton which has been redshifted from its original wavelength commonly due to Raman scattering experiences as the soliton propagates.

The intensity of the radiation generated at wavelengths $\lambda_{Rad} \pm \delta\lambda$ by one Raman soliton is given by the Frank-Tamm formula for Cherenkov radiation from electrons modified to apply for light bullets (solitons):

$$I(\lambda_{Rad} \pm \delta\lambda) = \quad (8)$$

$$\frac{2\pi}{137K} N_{Total} P(k) L_{SSFS} \left( \frac{1}{\lambda_{Rad} - \delta\lambda} - \frac{1}{\lambda_{Rad} + \delta\lambda} \right) \left( 1 - \left( \frac{v_G(\lambda_{Rad})}{v_G(\lambda_{Raman})} \right)^2 \right)$$

where $\delta\lambda$ represents a narrow wavelength interval. Here K is 2 for isotropic fibre designs and 1 for polarization maintaining fibre designs, $N_{Total}$ is the total number of photons in the individual soliton and $P(k)$ is the probability for k photons to arrive within a time interval "a" (=70 as), here k is the smallest integer which satisfies $k \geq v_{Rad}/v_{Raman}$, where $v_{rad}$ and $v_{Raman}$ are the generated radiation frequency and the Raman soliton central frequency, respectively, $L_{SSFS}$ is the distance of fibre travelled while the central wavelength of the Raman soliton is $\lambda_{Raman}$, and $v_G(\lambda_{Rad})$ and $v_G(\lambda_{Raman})$ are the group velocities at the radiation wavelength and Raman soliton wavelength, respectively. The probability for k photons to arrive within a time interval "a" is distributed in accordance with the Bose-Einstein distribution as the photons are bosons and the Raman gain from which the soliton grows in intensity are of spontaneous nature (thermal origin).

From equation 7 and 8 it is to be expected that both the intensity and wavelength of the generated radiation are determined by the self frequency shifting of the light bullet. The radiation is produced both in the infrared and in the ultra violet, visible, near infrared and infrared part of the spectrum dependent on the actual phase match obtained and of the position in the spectrum of the self frequency shifted Raman solitons. If the soliton self frequency shifting of the light bullet is too slow, the central wavelength of the light bullet may remain for a longer period at a given wavelength and hereby travel a longer distance leading to more intense radiation.

The Cherenkov radiation is fed with energy from the soliton which again is fed with energy by the pump through the modulation instability gain. If the self frequency shift is fast the light bullet generates no significant level of radiation at the corresponding phase match wavelengths. Although, previously unnoticed in the art, the latter situation may be observed in some prior art experiments, with pico- or nanosecond pulse generation of SCs, as a weak pilot beam or pilot peak appearing at relatively short wavelengths in the generated SC. Here the Raman solitons self frequency shift fast through the infrared to be slowed down at the infrared absorption edge of the fibre glass material or by lost confinement of the fibre core in the infrared or by micro-bending loss of the fibre in the infrared. In this context the term infrared absorption edge refers to absorptions and other losses occurring in the infrared region commonly in the form of peaks due to water absorption. In principle any loss mechanism may cause a reduction of the speed of the solitons self frequency shift. The loss of confinement or arrival at the micro-bending or infrared absorption edge may slow down the soliton self frequency shifting due to loss of energy likely causing the soliton to couple a larger fraction of its energy to corresponding shorter wavelengths causing said pilot peak. No attention has, however, been paid to the pilot beam in the pico- or nanosecond pulse generation. In Price et al. (Optics Express Vol, 10., No. 8, Mar. 20, 2002) the blue extended spectrum is obtained as a result of such a phase match but no explanation was given for the observed spectrum and no route is given to describe how a higher spectral density can be obtained.

Particularly intense radiation can be achieved in situations where the soliton central frequency is stabilized by the action of a negative dispersion slope as known from Skryabin et al. (Science, Vol. 30, pp 1705-1708, 19 Sep. 2003). Here intense radiation with wavelengths in the vicinity of the stabilized solitons near the second (red shifted) zero dispersion wavelength is expected.

To obtain a spectrum that extends as far as possible into the deep blue part of the spectrum (with wavelengths<480 nm) or even into the ultraviolet regime (with wavelengths <400 nm) the Raman solitons have to proceed long enough in their self frequency shifting so as to couple energy to the wavelength through phase match. Accordingly, in one embodiment the Raman solitons proceed long enough in their self frequency shifting into the infrared to wavelengths beyond 2200 nm, such as beyond 2500 nm, such as beyond 2700 nm. This may be achieved when the launched quasi-cw pump pulse is chosen to hold a central wavelength close to the zero dispersion wavelength of the micro-structured fibre on the anomalous dispersion regime side. In this situation the modulation instability gain curve may extend far into the infrared lending gain to the terahertz repetition rate Raman soliton train that is generated from the launched quasi-cw pump pulse allowing the Raman solitons to self frequency shift into the infrared.

An objective of the invention is to provide a scheme for extending the spectrum beyond (i.e. below) 480 nm, such as below 450 nm, such as below 425 nm, such as below 400 nm. It is a further object to generate light at UV or visible wavelengths with spectral density above −10 dBm/nm (>0.1 mW/nm).

DISCLOSURE OF INVENTION

The present invention relates to a blue extended super continuum light source according to claim 1. Hereby efficient generation of radiation is achieved such that the generated spectrum extends to a low wavelength border $\lambda_{low}$ in the deep blue part of the spectrum, such as below 480 nm, and the intensity of at least part of the generated radiation $I(\lambda)$ is larger than a minimum level, such as −20 dBm or −15 dBm or −10 dBm, where $\lambda_{low}<\lambda<\lambda_{low}+\Delta\lambda$, where $\Delta\lambda$ is equal to 50 nm or 100 nm or 200 nm. In one embodiment the present invention relates to a extended super continuum light source according to claim 13.

In the context of this terahertz refers to the range $0.1 \cdot 10^{12}$ Hz to $10000 \cdot 10^{12}$ Hz.

In an embodiment, the optical transmission medium is adapted to have a zero dispersion wavelength $\lambda_{zero}$ smaller than or equal to the pump wavelength $\lambda_{pump}$ and a second order dispersion parameter $\beta_2(\lambda_{pump})$, and a non-linear parameter $\gamma(\lambda_{pump})$, so that the modulation instability gain is extended to wavelengths exceeding a high wavelength border $\lambda_{high}$ above 1100 nm, such above 1200 nm, such as above 1300, such as above 1400, such as above 1500, such as above 1600, such as above 1700, such as above 1800, such as above 1900 nm, such as above 2000, such as above 2100, such as above 2200, such as above 2300, such as above 2400, such as above 2500.

In one embodiment $\lambda_{high}$ is the highest wavelength of the generated SC. In an embodiment the intensity of at least part of the generated radiation $I(\lambda)$ is larger than a minimum level, such as −20 dBm or −15 dBm or −10 dBm, where $\lambda_{high}-\Delta\lambda<\lambda<\lambda_{high}$, where $\Delta\lambda$ is equal to 50 nm or 100 nm or 200 nm.

In an embodiment, a phase match between the low wavelength border $\lambda_{low}$ and an infra red wavelength $\lambda_{match}>\lambda_{high}$ is provided at the peak power. In an embodiment, the group velocity at the infra red wavelength $\lambda_{match}$ is chosen so that it is larger than the group velocity at said low wavelength border. In an embodiment, the peak power, the second order dispersion parameter $\beta_2$, the non-linear parameter $\gamma$, the pump pulse wavelength $\lambda_{pump}$, and the pump pulse duration, are chosen such that a at least a part of each of said pump pulses breaks into trains of Terahertz repetition rate pulses.

Some of the characteristics of a super continuum spectrum $I(\lambda)$ according to the invention (including the above mentioned wavelengths $\lambda_{low}$, $\lambda_{zero}$ and $\lambda_{pump}$) are schematically indicated in FIG. 8, where $P_{blue}$ and $P_{red}$ indicate the 'blue shifted part' and the 'red shifted part' of the spectrum, respectively. The scale of the $I(\lambda)$-axis can be logarithmic (e.g. in units of dBm/nm) and the scale of the $\lambda$-axis linear (e.g. correspondingly in units of nm). An exemplary schematic dispersion curve $D(\lambda)$ is shown in FIG. 8b indicating an anomalous dispersion around the pump wavelength $\lambda_{pump}$ ($D(\lambda_{pump})>0$, e.g. +8 ps/nm/km). From FIG. 8c and equations 1 and 9 one may realize that pumping closer to $\lambda_{zero}$ may extend $g_{MI}$ to higher wavelengths thus allow a further redshift of the (Raman) solitons which in turn allow for a further extension of the SC for shorter wavelengths. Accordingly, in one preferred embodiment the pump is adapted to provide optical power in at least part of the range so that in one embodiment $\lambda_{pump}$ relates to $\lambda_{zero}$ so that 200 nm$\geq(\lambda_{pump}-\lambda_{zero})\geq-10$ nm, such as 100 nm$\geq(\lambda_{pump}-\lambda_{zero})\geq-10$ nm, 50 nm$\geq(\lambda_{pump}-\lambda_{zero})\geq-10$ nm, such as 20 nm$\geq(\lambda_{pump}-\lambda_{zero})\geq-10$ nm, such as 10 nm$\geq(\lambda_{pump}-\lambda_{zero})\geq-10$ nm, such as 5 nm$\geq(\lambda_{pump}-\lambda_{zero})\geq-10$ nm, such as 2 nm$\geq(\lambda_{pump}-\lambda_{zero})\geq-10$ nm, 200 nm$\geq(\lambda_{pump}-\lambda_{zero})\geq 0$ nm such as 100 nm$\geq(\lambda_{pump}-\lambda_{zero})\geq 0$ nm, 50 nm$\geq(\lambda_{pump}-\lambda_{zero})\geq 0$ nm, such as 20 nm$\geq(\lambda_{pump}-\lambda_{zero})\geq 0$ nm, such as 10 nm$\geq(\lambda_{pump}-\lambda_{zero})\geq 0$ nm, such as 5 nm$\geq(\lambda_{pump}-\lambda_{zero})\geq 0$ nm, such as 2 nm$\geq(\lambda_{pump}-\lambda_{zero})\geq 0$ nm. These ranges have been expanded taking into consideration that experimental determination of $\lambda_{zero}$ in a real fibre may relatively high degree of uncertainty.

In principle pumping may be performed in any way resulting in the desired pump pulses above the zero dispersion wavelength experienced by these pulses. The provision of optical power may be performed by pumping substantially at the desired wavelength(s) or wavelength span. However, as an optical pulse has a finite bandwidth, pumping at the zero dispersion wavelength or below the zero dispersion wavelength may provide optical power above the zero dispersions wavelength. Furthermore, in some cases non-linear effects may provide the desired optical power indirectly. An exemplary schematic modulation instability gain curve $g_{MI}(\lambda)$ for a specific peak power $P_{peak}$ is shown in FIG. 8c.

An advantage of the present invention is the possibility to use longer pump pulses, which is attractive as it does not require a complex and expensive femto second laser. This has so far been one obstacle to the creation of commercially viable SC light sources.

The term 'the duration of pulses' is in the present context taken to mean the Full Width Half Maximum duration for Gaussian pulses of essentially constant peak power.

The term 'a micro-structured optical transmission medium' is in the present context taken to mean a medium comprising a photonic crystal fibre, also known as micro-structured fibres or holey fibres, cf. e.g. T. A. Birks, J. C. Knight, and P. St. J. Russell, "Endlessly single-mode photonic crystal fibre," Optics Letters, Vol. 22, pp. 961-963 (1997). Various aspects of the design, properties, manufacturing and applications of micro-structured optical fibres are e.g. discussed in Bjarklev, Broeng, and Bjarklev in "Photonic crystal fibres", Kluwer Academic Press, 2003 ([Bjarklev et al.]). In an embodiment, the term 'a micro-structured optical transmission medium' specifically refers to the material(s) and the arrangement of micro-structural features of the micro-structured fibre determining its transmission properties, e.g. silica, in some regions of the fibre possibly comprising one or more dopant elements and/or voids. In an embodiment, a micro-structured optical transmission medium is a micro-structured fibre.

The term 'anomalous dispersion' is in the present context taken to indicate a dispersion coefficient larger than 0 (such as larger than +1 or +2 ps/nm/km, e.g. +5 ps/nm/km).

In an embodiment, the wavelength of 'a low wavelength border $v_{low}$' is taken to mean the smallest wavelength of the SC-spectrum having a spectral intensity larger than −40 dBm, such as larger than −30 dBm but preferably larger than −20 dBm, such as larger than −13 dBm, such as larger than −10 dBm, such as larger than −5 dBm. In a particular embodiment, the wavelength of 'a low wavelength border $v_{low}$' is taken to mean the smallest wavelength of the continuous spectrum having a spectral intensity larger than 40 dBm, such as larger than −30 dBm but preferably larger than −20 dBm, such as larger than −13 dBm, such as larger than −10 dBm, such as larger than −5 dBm.

By placing the pump wavelength in the anomalous dispersion region of the micro-structured fibre (cf. FIG. 8b, 8c), modulation instability gain is created next to the pump. The extension of this modulation instability gain is a function of the launched pump peak power $P_{peak}$, and the gain $g_{MI}$ is given by equation 9:

$$g_{MI} = |\beta_2 \Omega| \sqrt{\Omega_C^2 - \Omega^2} \qquad (9)$$

Here $\Omega = (\omega - \omega_{pump})$, where $\omega_{pump} = 2\pi c/\lambda_{pump}$ and $\Omega_C^2 = 4\gamma P_{Peak}/|\beta_2|$.

The creation of blue shifted light relative to the pump wavelength by excitation of Cherenkov radiation is an attractive alternative to the before mentioned processes as it generates light from the launched pump energy primarily in the bands where the light is wanted when the fibre is dispersion managed relative to the pump wavelength and pulse peak power.

To obtain a substantial increase in the blue part of the spectrum, the duration of the pump pulses, which is some cases may be regarded as quasi-CW, is preferably tailored to the actual fibre. If a high intensity Cherenkov radiation line is wanted, the Raman solitons may in some case be advantageously shifted to the infrared (>2000 nm) as fast as possible by the soliton self frequency shift. This may lead to less energy shed to other wavelengths than the—in this situation—wanted band of wavelengths near the phase matching between the Raman soliton in the infrared and the deep blue radiation (Cherenkov radiation). The fast soliton self frequency shifting can be achieved by choosing a fibre with a high dispersion ($\beta_2$) (e.g. lager than 10 ps/(nm·km)) at all wavelengths longer than or equal to the pump wavelength $\lambda_{pump}$ and/or by increasing the launched peak power to achieve a shorter Raman soliton duration ($T_0$) according to equation (5).

In one embodiment, the group velocity $v_g$(soliton) of the soliton exceed the group velocity $v_g$(Cherenkow) of the wavelengths where the Cherenkov radiation is wanted. A wider band with high spectral density Cherenkov radiation may be achieved when the soliton self frequency shifting is held at a moderate level (e.g. $\beta_2$ in the range from 5 to 10 ps/(nm·km)) such that the soliton rests for a longer stretch of fibre at a given central wavelength. In one such embodiment, the group velocity of the soliton pulse exceed the group velocity of the wavelengths where the Cherenkov radiation is wanted ($v_g$(soliton)>$v_g$(Cherenkow)).

In one embodiment $v_g$(soliton)>$v_g$(Cherenkow); However as the soliton red shifts further $v_g$(soliton) may be reduced below $v_g$(Cherenkow) so that this pulse of shorter wavelengths catches up with the soliton again. In this event further energy may be transferred to the short wavelength pulse (Cherenkow). In one embodiment, the impact of the soliton on the material of the transmission medium may prevent the short wavelength pulse from passing the soliton which slows down further as it red—shifts. This deceleration will therefore also decelerate the short wavelength pulse which may shift to shorter wavelengths if the relation between wavelength and group—velocity so provides. In one embodiment the short wavelength pulse and the soliton pulse interacts through cross-phase modulation which may cause the short wavelength pulse to shift to blue-shift which may in decelerate short wavelength pulse. As the soliton pulse red-shifts further it decelerates allowing further interaction with the short wavelength pulse. In a one embodiment the interaction between soliton pulse and the short wavelength pulse occurs at least below a high wavelength limit $\lambda_{high} \geq 2700$ nm such a below $\lambda_{high} \geq 2500$ nm, such as below $\lambda_{high} \geq 2200$ nm in order to allow the interaction to occur before loses reduce the optical power of the soliton. In one embodiment the modulation instability gain extends to longer wavelengths.

Accordingly, in one embodiment the micro-structured optical transmission medium is arranged so that at least part of the light having a wavelength below $\lambda_{zero}$ interacts with part of the light having a wavelength equal to or longer than $\lambda_{zero}$ so the wavelength of said part of the light below $\lambda_{zero}$ is reduced. In one embodiment the a micro-structured optical transmission medium is arranged so that at least part of the light having a wavelength below $\lambda_{low}$ interacts with part of the light having a wavelength equal to or longer than $\lambda_{match}$ so the wavelength of said part of the light below $\lambda_{low}$ is reduced.

To reach attractive spectral density levels substantial pump pulse energy is required. This can be done by increasing the pulse energy of individually launched pulses and/or their repetition rate, while maintaining the peak power level of the launched pulses. However, limitations in these parameters may be influences by the pump source as well as thermal breakdown of the transmission medium.

To find the condition given by equation 7, it is required to determine the group velocity dispersion of the fibre of interest to determine the dispersion as well as the dispersion slope (i.e. $\beta_2$ and $\beta_3 = d\beta_2/d\omega$) and preferentially even higher order terms. A white light interferometer measuring method for this purpose is disclosed in ECOC 2002 paper 3.4.2 by Andersen et al. "A photonic crystal fiber with zero dispersion at 1064 nm".

Further, dependent on the actual desired spectrum, the fibre parameters may be chosen accordingly. Examples of this are shown in connection with example 1 and example 2.

The duration of the initially launched pulse should preferably hold a length which makes it viable to initiate the modulation instability gain. If the pulse duration is too short this instability gain may not come into play as the dispersion of the fibre may counteract the initial pulse broadening set by the self phase modulation of the pulse and hereby transform the initially launched pulse into a soliton. The initially launched pulse may self frequency shift and hereby prevent the modulation instability gain to develop sufficiently high amounts of power in the sidebands to break the initially launched pulse into smaller pulses. The initially launched pulse should therefore be kept above a minimum duration of 0.1-0.2 picoseconds, e.g. above 0.15 ps such as above 0.2 ps. Going below this duration may lead to a less efficient generation of a super continuum as only a single or a small number of pulses may be available for the radiation process once the self frequency shifting starts. As the cost price of a laser system among other things is dependent on the pulse duration, it is preferred that the duration of the initial launched pulses is larger than 0.25 ps, such as larger than 0.5 ps, such as larger than 1.0 ps, such as larger than 5 ps, such as larger than 10 ps, such as larger than 50 ps, such as larger than 1 ns, such as larger than 2 ns, such as larger than 10 ns. The longer the pulse, the higher amount of energy may be dissipated into material vibrations (heat), which suggests that as the pulse duration increases the peak power has to decrease such that a thermal breakdown of the fibre material is avoided. I.e. there is a trade off between pulse duration and achievable spectral expansion into the deep blue. The repetition rate of the initially launched pulses determines the power level produced in the super continuum. To obtain a quasi-cw super continuum the repetition rate of the initially launched pulses is preferentially to be larger than or equal to 1 MHz, such as $\geqq 5$ MHz, such as $\geqq 10$ MHz, such as $\geqq 20$ MHz, such as $\geqq 40$ MHz, such as $\geqq 60$ MHz, $\geqq 80$ MHz, such as $\geqq 160$ MHz, such as $\geqq 500$ MHz. This is particularly relevant in applications where the functionality of a CW source is required.

The level of needed pump peak power is strongly dependent on the actual fibre dispersion and nonlinear coefficients. Preferably, the peak power is optimized to the dispersion and non-linear coefficients of the actual fibre to produce a super continuum with a minimum low wavelength border $\lambda_{low}$. Preferably, the output power in the super continuum is optimized to the pulse duration and pulse repetition rate of the launched pump pulses to a wanted output level (dBm/nm).

It is an advantage that as much of the generated light as possible goes into the blue part of the spectrum as the SC in application is often subjected to a spectral slicing. A polarization maintaining design is advantageous where high spectral intensity is wanted.

Dependent on the wavelength range that is wanted for the specific application, the pump laser wavelength is preferably chosen longer than 600 nm. This is mainly due to the fact that current technology only allows for micro-structured fibres with a zero dispersion wavelength above 550 nm-580 nm. It night, however, be lower than 600 urn, if an appropriate transmission medium were available. Given that the pump wavelength has to be placed in a region with anomalous dispersion this sets the lower limit of the applicable laser wavelength to about 600 nm. It is however, advantageous to choose a longer wavelength such as in the range 900 nm to 1300 nm, so that a powerful and still economic laser source becomes available. Lasers with wavelengths in the range of 1000 nm to 1100 nm gives at present a good combination of economy and laser pump power. Especially mode locked fibre lasers based on ytterbium doped fibres appears as an advantageous choice. In the context of the present text terms pump laser and pump source are used interchangeably. In principle the pump light may be provide by any suitable source, however, a laser is often preferred as it often has superior spatial and or temporal coherence properties.

The transmission medium may comprise any appropriate optical wave-guiding medium exhibiting an anomalous dispersion and for which a phase match can be produced between the solitons and the dissipative wave. Preferably, the transmission medium comprises a silica based optical fibre, e.g. a micro structure optical fibre. Many different transversal arrangements of micro structure features of the optical fibre of the transmission medium may be used. A very efficient medium for achieving the high nonlinear response and simultaneously to manage the dispersion is found in a micro-structured optical silica fibre with a waveguide structure having a longitudinal direction, said micro-structured optical fibre comprising: a solid core region extending along the longitudinal direction, and a cladding region extending along the longitudinal direction, said cladding region comprising a triangular hole pattern separated by a pitch $\Lambda$ (i.e. the centre to centre distance between micro-structural elements in a cross-section of the fibre) and with a ratio of a maximum cross-sectional dimension of a micro-structural element (e.g. a hole diameter) d relative to the pitch, $d/\Lambda$, $\geqq 0.2$. [Bjarklev et al.] describe e.g. dispersion properties (cf. e.g. chapter 5.3.4, pp. 148-151) and the fabrication (cf. e.g. chapter 4, pp. 115-130) of micro-structured optical fibres (including triangularly structured fibres).

This micro-structured fibre should advantageously hold at least one first zero dispersion wavelength below 1300 nm, such as below 1100 nm, such as below 1064 nm, such as below 1000 nm, such as below 900 nm. The tailoring of the dispersion properties of micro-structured fibres is e.g. discussed in WO-02/12931, WO-02/39159, WO-02/088801, WO-02/084350 and WO-03/079074. The choice of zero dispersion wavelength for the fibre depends among other things on the choice of laser source.

Further, it is advantageous if the fibre is arranged to support propagation of the wavelength $\lambda_{pump}$ in a single transverse mode (cf. e.g. T. A. Birks, J. C. Knight, and P. St. J. Russell, "Endlessly single-mode photonic crystal fibre," Optics Letters, vol. 22, pp. 961-963 (1997). For some applications it is advantageous if the fibre is arranged to support propagation of all generated wavelengths in the spectrum of wavelengths in a single transverse mode. This will guarantee that the generated light only is delivered in one single transverse mode. However, in some embodiments this requirement may be considered less strictly as it turns out that light generated from light in the single mode region of the transmission medium, such as blue light generated from solitons in the infrared, will tend to remain in a single mode. Accordingly, single mode operation at all generated wavelengths is achievable even though for some ranges the fibre is not strictly single mode.

In the context of this text the terms transmission medium, fibre, optical fibre and micro-structured fibre is used interchangeably unless specific characteristics of that medium is discussed. The transmission medium may in principle be any transmission medium exhibiting similar non-linear and dispersion characteristics so that the train of soliton pulses may arise as well as red-shift.

For those applications that need polarized light it may be an advantage that the micro-structured fibre is arranged to be polarization maintaining. (e.g. by introducing an anisotropy in the core region (by form, stress etc., cf. e.g. WO 00/49436 or WO 2005/059612)). This is due to the fact that the generated radiation obtained when using a homogeneous micro-structured fibre (with equal longitudinal propagation of the two degenerate states of the ground mode) is not polarized. For a non-polarization maintaining fibre, polarized light can be obtained by placing a polarizer in front of the fibre, however at the expense of half the generated radiation power.

As the output power of the super continuum light source is directly a measure of the needed pump power level, some applications might only need a moderate output power level which can be achieved with a more economic pump laser. In these cases the generated radiation is advantageously larger than −10 dBm/nm for at least part of said generated radiation. However, as the sensitivity of many applications may gain with a more powerful light source it might be advantageous to increase the output power level of the generated radiation. This to a level such as larger than −5 dBm/nm, such as larger than 0 dBm/nm, such as larger than 3 dBm/nm, such as larger than 5 dBm/nm, such as larger than 10 dBm/nm, such as larger than 12 dBm/nm, such as larger than 15 dBm/nm, all as an average value within the wavelength range $\lambda_{low} < \lambda < \lambda_{low} + \Delta\lambda$, where the intensity level is for at least part of said generated radiation, and where $\Delta\lambda$ is equal to 50 nm or 100 nm or 200 nm.

An article comprising a super continuum light source as described above, in the detailed description and in the claims is furthermore provided. The article may e.g. be optimized for use in applications such as spectroscopy, confocal microscopy, ultra-short-pulse generation, optical radar and ranging (LIDAR), optical computing, reaction rate studies, etc.

In an embodiment of the invention relates to a system comprising a deep blue extended super continuum light source according to the invention, such as a spectroscope, a confocal microscope, an ultra-short-pulse generator, a LIDAR, or an optical computer.

In an embodiment the invention relates to a method of manufacturing a blue extended super continuum light source according to claim 12.

In an embodiment the invention relates to a method of manufacturing a blue extended super continuum light source according to claim 42.

The method provides the same advantages as the corresponding product. The features of the product as described above and in the detailed description below and in the claims are intended to be used in combination with the method, where appropriate.

Further objects of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF THE DRAWINGS

In the following, the invention will be explained in more details with reference to the New blue extended super continuum light source according to the invention shown in the drawing, in that FIG. 1 shows a prior art optical spectrum of a SC generated in a 75 cm section of micro-structured fibre with 8 kW input peak power. The dashed curve shows the spectrum of the initial 100 fs pulse. Prior art by Ranka et al. (Optics Letters, Vol. 25, No. 1, January (2000), pp. 25-27).

MODE(S) OF CARRYING OUT THE INVENTION

In the following, the dimensioning and application of the new blue extended super continuum light source will be discussed in connection with a number of examples.

Example 1

Figure 1:
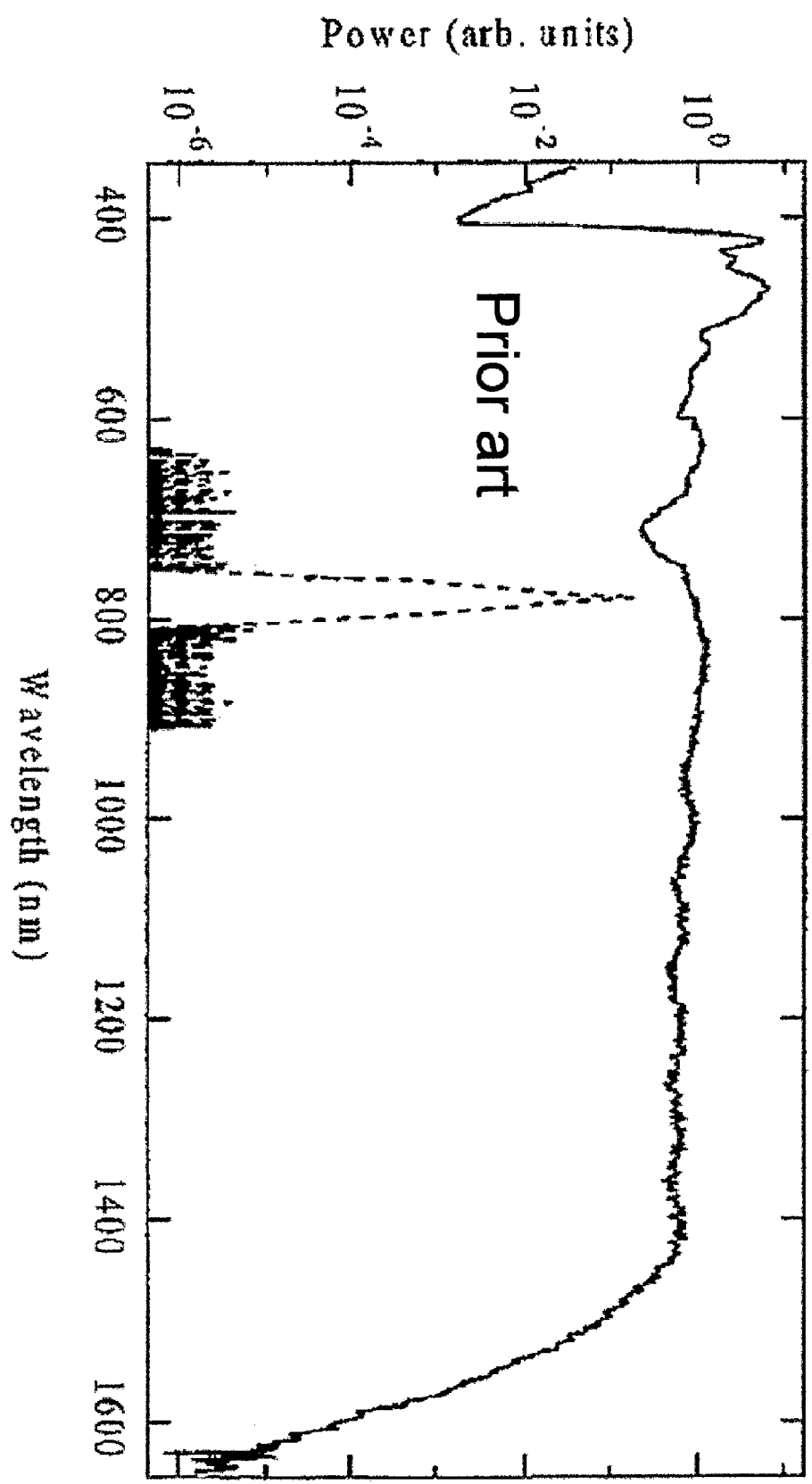
Figure 2:
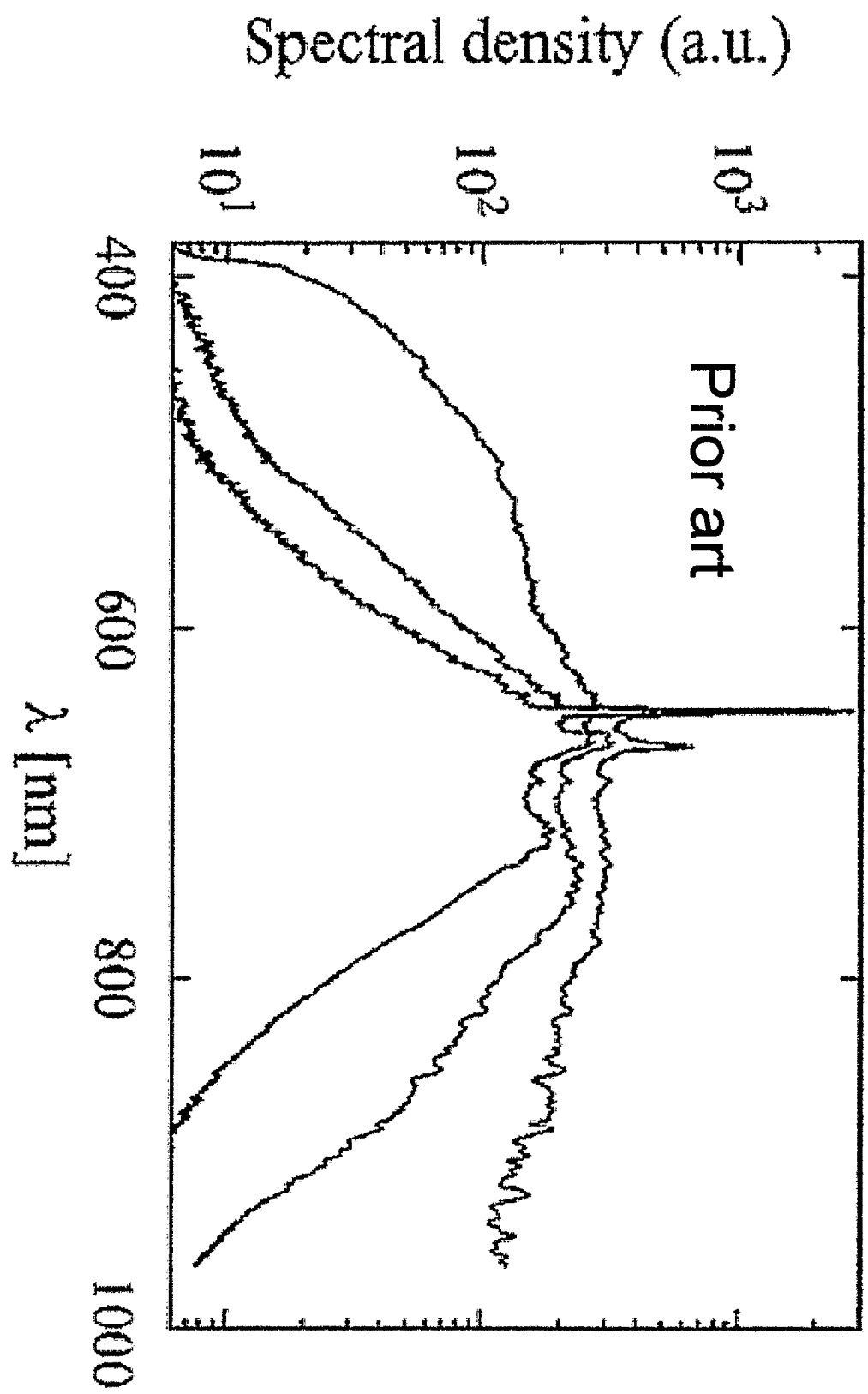
FIG. 2 shows a prior art optical spectrum of a SC generated in a 10 m section of micro-structured fibre. The launched pulse duration is 60 ps with input peak powers of (from bottom to top) P=120 W, P=225 W, and P=675 W. Prior art by Coen et al. (Optics Letters, Vol. 26, No. 17, September (2001), pp. 1356-1358)
Figure 3:
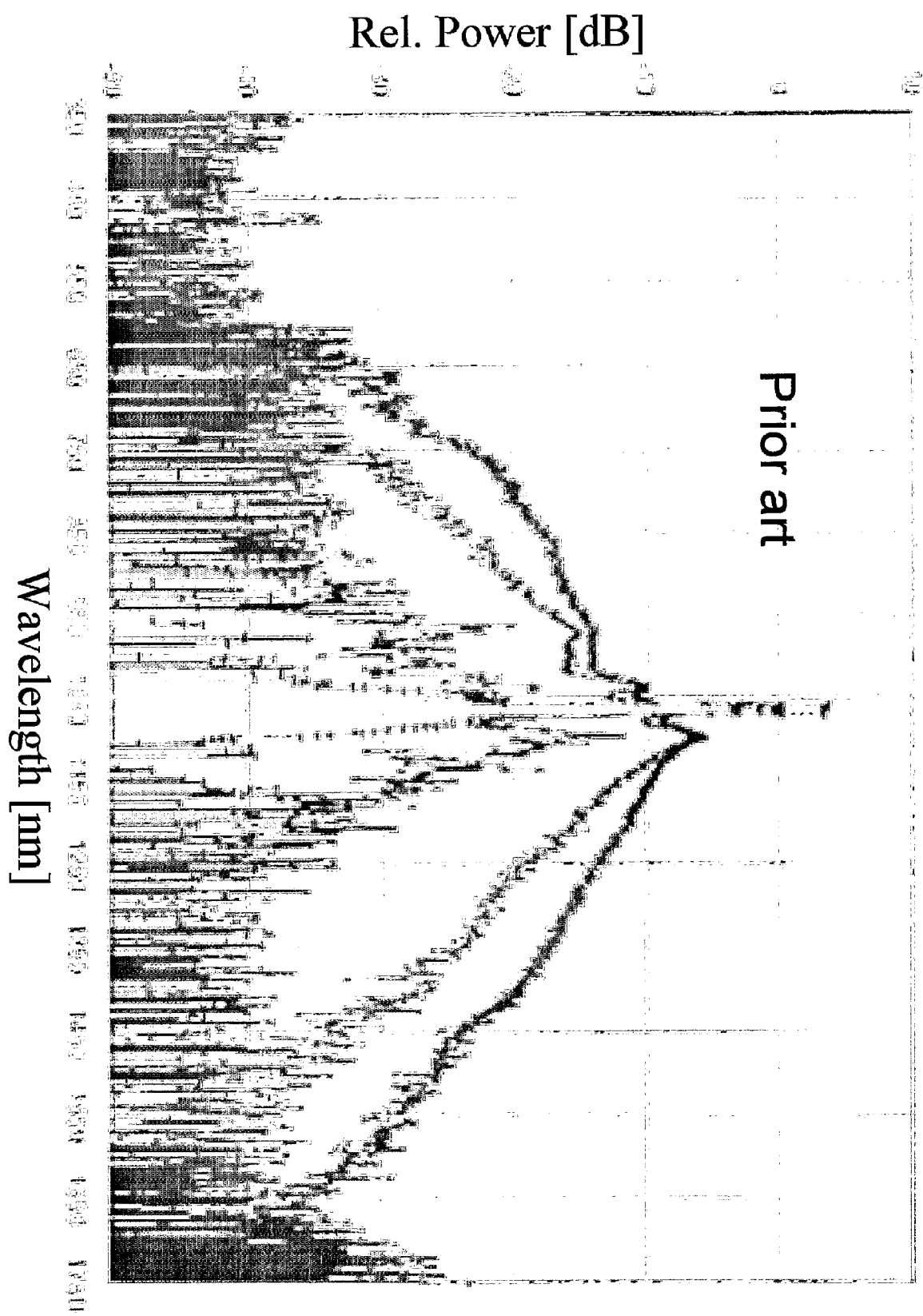
FIG. 3 shows a prior art optical spectrum of a SC generated in a 2 m section of micro-structured fibre. The launched pulse duration is 42 ns with input peak powers of (from bottom to top) P=1 kW, P=3.5 kW, P=5.5 kW and P=10 kW. Prior art by Town et al. Applied physics B (Lasers and Optics), Vol. B77, No. 2-3, September 2003, pp. 235-238.
Figure 4:
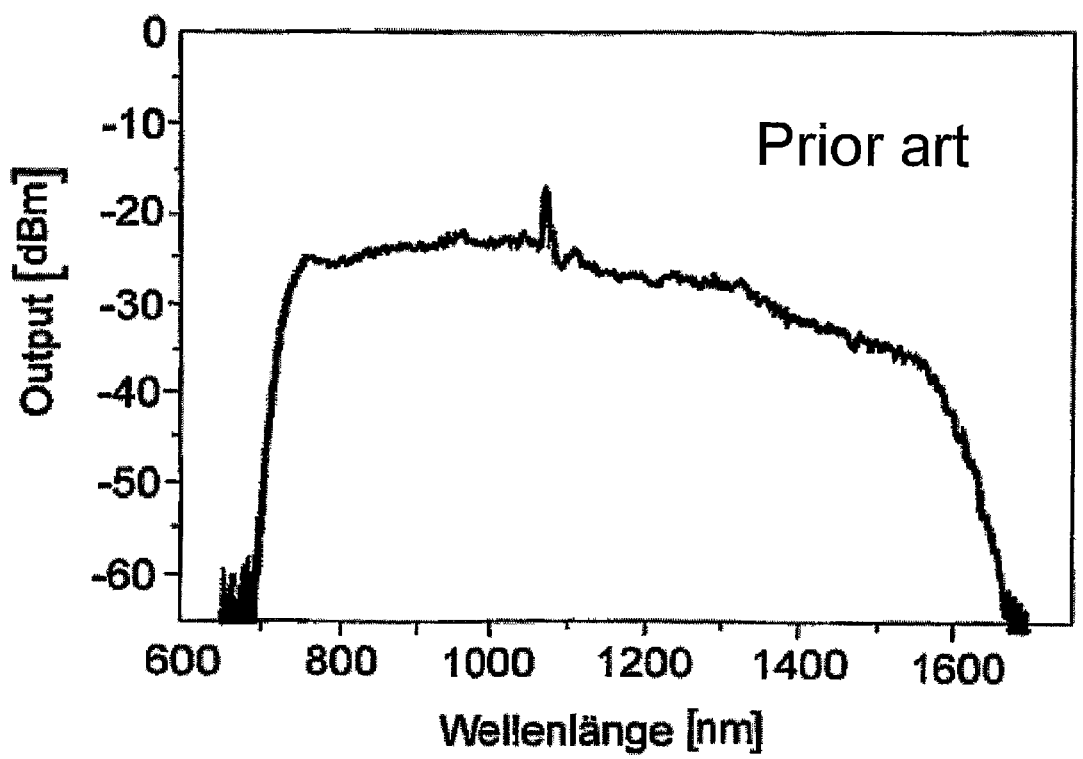
FIG. 4 shows a prior art optical spectrum of a SC generated in a 5 m section of micro-structured fibre. The launched pulse duration is 8.5 ps with input peak powers of P=5.8 kW. Prior art by Braun and Bertram European patent EP 1 502 332.
Figure 5:
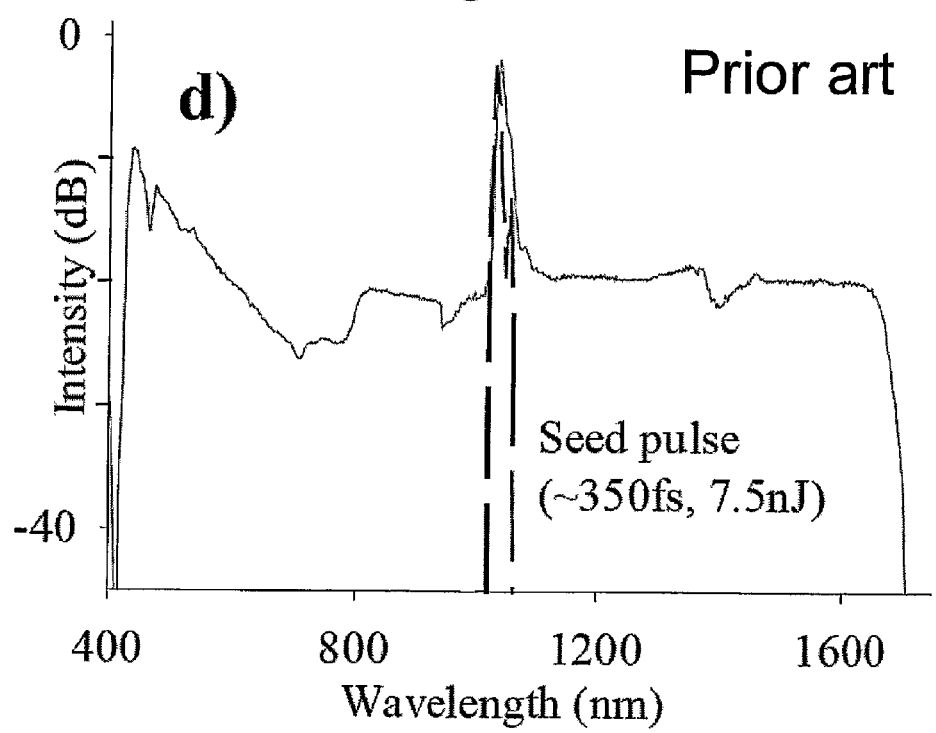
FIG. 5 shows a prior art optical spectrum of a SC generated in a 7 m section of non periodic micro-structured fibre. The launched pulse duration is 350 fs with input peak power of P=21 kW. Prior art by Price et al. (Optics Express Vol. 10, No. 8, March 20 (2002))
Figure 6:
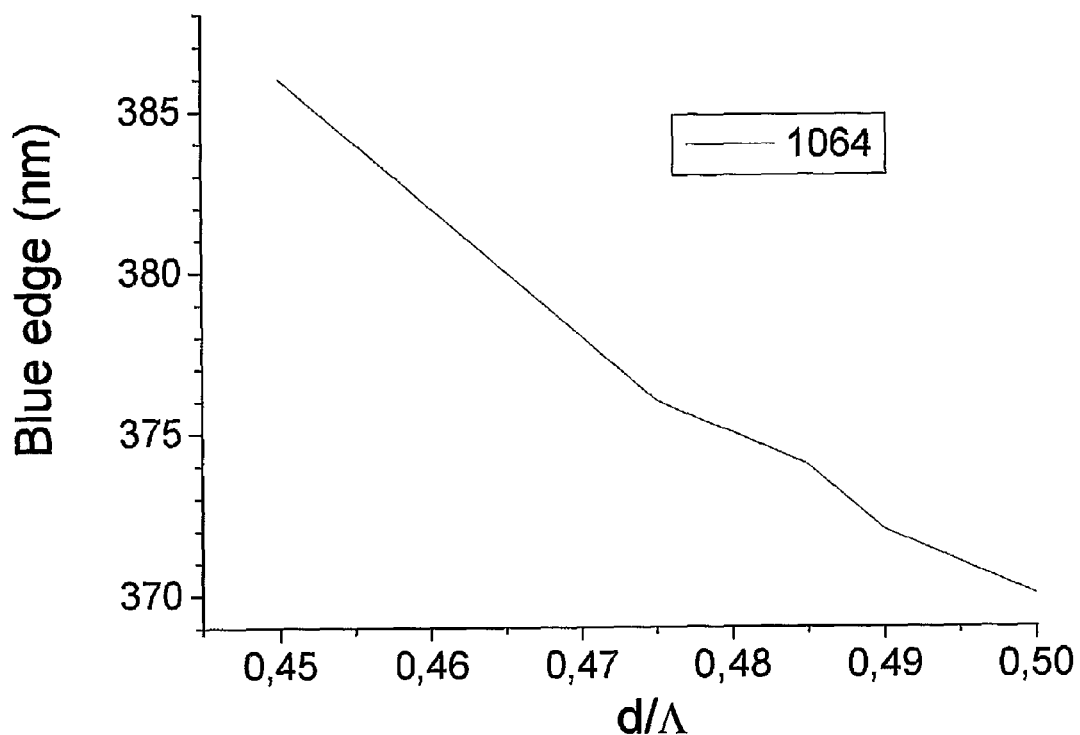
FIG. 6 shows a plot of the calculated ultraviolet absorption edge wavelength as function of fibre design parameter d/Λ for a continuum generated according to the present invention.

To produce a deep blue extended spectrum, one way to proceed is to choose a fibre with a zero dispersion wavelength in the range between 1 nm and 20 nm below the available MHz, pico second laser source operating at wavelength $\lambda_{pump}$. In this example the pump wavelength is chosen at 1068 nm and the zero dispersion wavelength at 1064 nm. In FIG. 6 the blue edge wavelength to which the SC extends is calculated as a function of d/Λ for fibre designs that hold zero dispersion wavelength at 1064 nm. This calculation was performed based on the calculated dispersion curve, the equations of the generations and propagation of the solitons presented above as well as their gain as the solitons propagates and red-shifts. It is assumed that the fibre is sufficiently long (in this case about 30 meters) so that the red-shifting solitons will run out of energy either by shifting outside the modulation instability gain and/or by outrunning the pump pulse. As the soliton "dies" it is assumed that it couples part of its remaining energy to the pilot beam discussed above the wavelength of which is plotted in FIG. 6. In the calculation the applied launched peak power density is 825 W/μm², launched into the effective core area of a step index equivalent fibre core. From FIG. 6 it is expected that the blue edge shifts deeper into the ultraviolet when the d/Λ parameter increases in size. The d/Λ parameter is preferably—at a pump wavelength of 1068 nm—chosen to be below 0.51 to maintain single mode operation at the pump wavelength and simultaneously preferably exhibit anomalous dispersion and a zero dispersion wavelength no further away from the pump wavelength than 1048 nm, here assuming that the fibre is manufactured from pure amorphous silica material (SiO₂). Examples pitch parameter Λ and d/Λ parameter combinations that lead to a 1064 nm zero dispersion wavelength for the given silica material are: (d/Λ, Λ)=(0.45, 3.29 μm); (0.46, 3.33 μm); (0.47, 3.37 μm); (0.48, 3.41 μm); (0.49, 3.44 μm) (0.5, 3.5 μm). It is further preferable that at least 4 rings of holes are placed around the solid core to avoid loss of confinement for wavelengths in the infrared exceeding 1700 nm. Such fibres are e.g. available from Crystal Fibre A/S (Birkeroed, Denmark).

It is noted that a requirement of endlessly single mode operation of the fibre design—corresponding to a required d/Λ≦0.45—causes the available spectrum to be reduced with 15 nm compared with the design that only guarantees single mode operation at the pump wavelength. The endlessly single mode requirement is, however, advantageous where a high quality (diffraction limited) spectral beam is wanted.

To apply this spectrum as a light source for example in connection with spectroscopy or confocal microscopy, spectral slicing of the spectrum by use of either glass filters or mirrors is an easy way to produce light with the wanted bandwidth. Adjusting the peak power level of the excitation source is one way to adjust the power level of the generated light. Another possible way is through use of neutral density filtering of the spectra. The spectral filtering is usually performed by use of spatial filters (pin holes) which restrict the usable spectrum to the part of the spectrum that is guided in the fundamental mode. The highest efficiency in such applications may be obtained in endlessly single mode sources where all energy is supplied in the fundamental mode.

Example 2

Figure 7:
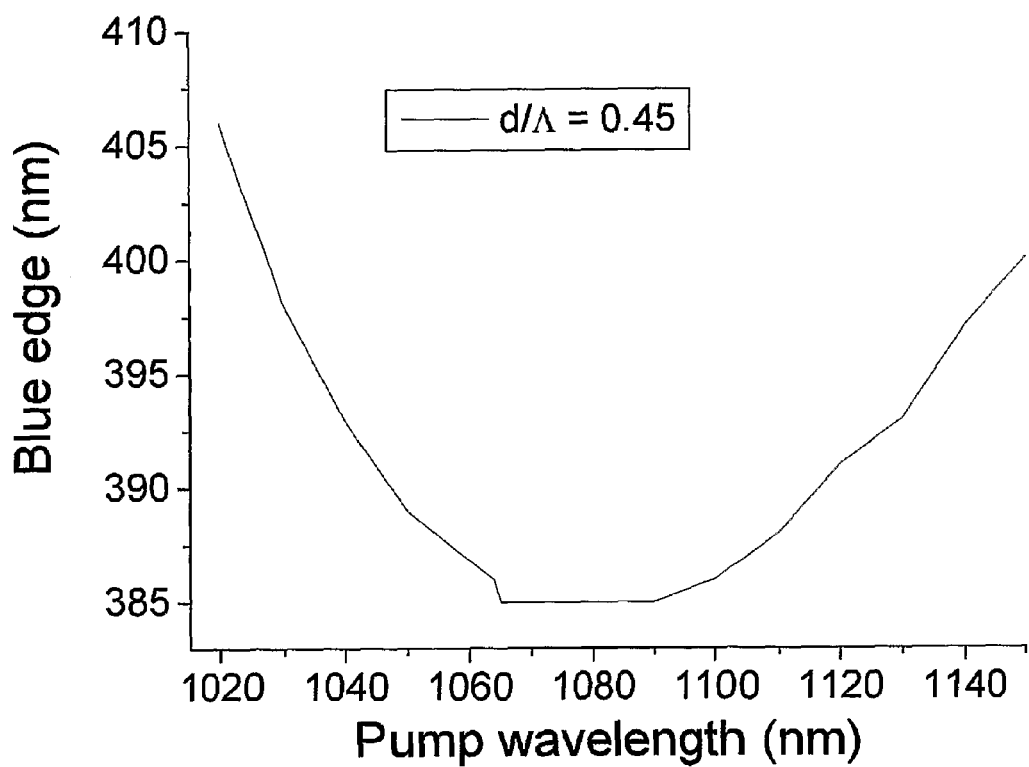
FIG. 7 shows a plot of the calculated blue edge radiation wavelength as function of pump wavelength in one aspect of the present invention.
Figure 8A:
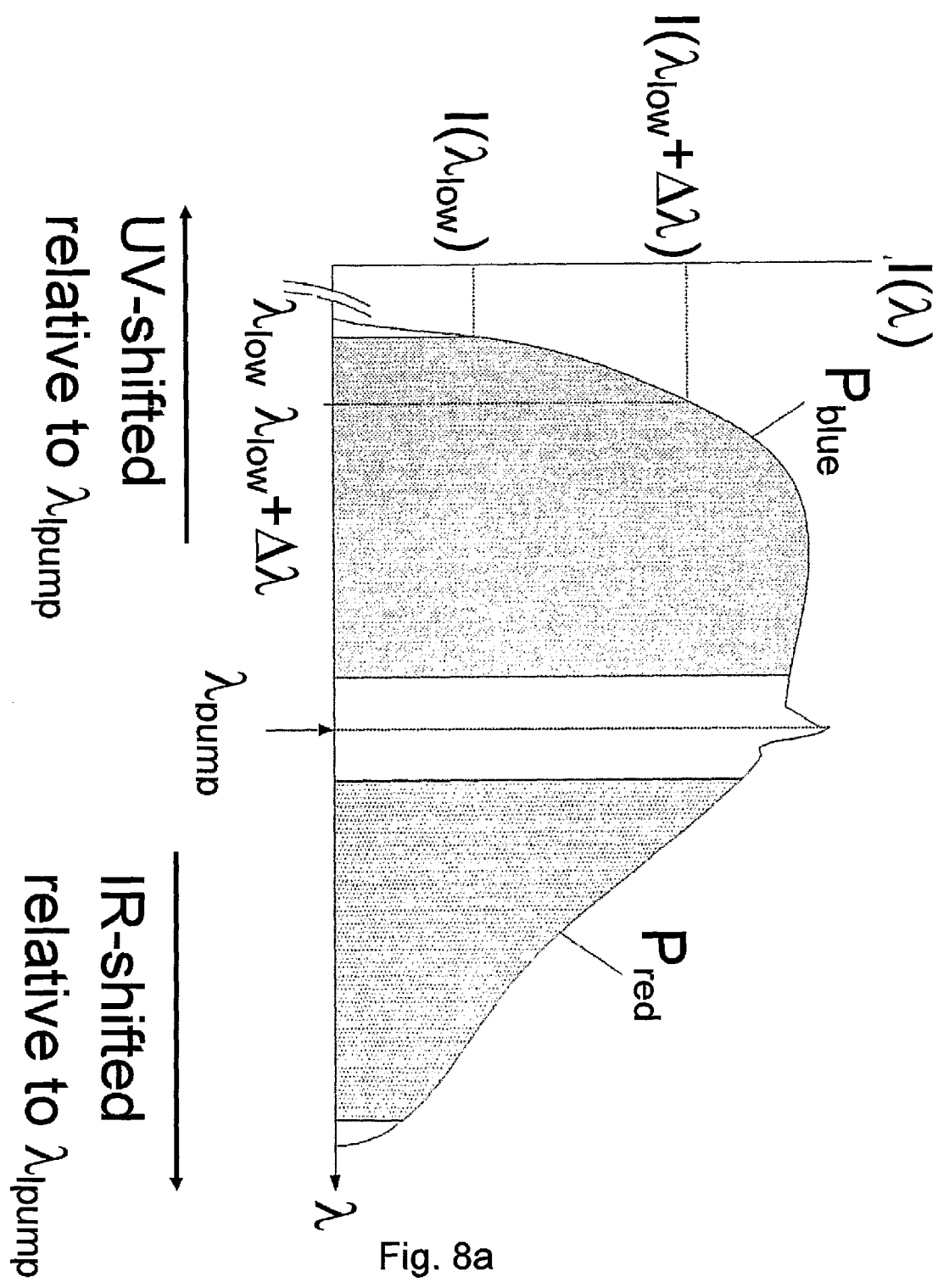
FIG. 8 schematically shows an optical spectrum of a continuum according to the invention indicating parameters for characterising the spectrum (FIG. 8*a*), a dispersion vs. wavelength curve (FIG. 8*b*) and a modulation instability gain vs. wavelength curve (FIG. 8*c*).
Figure 8B:
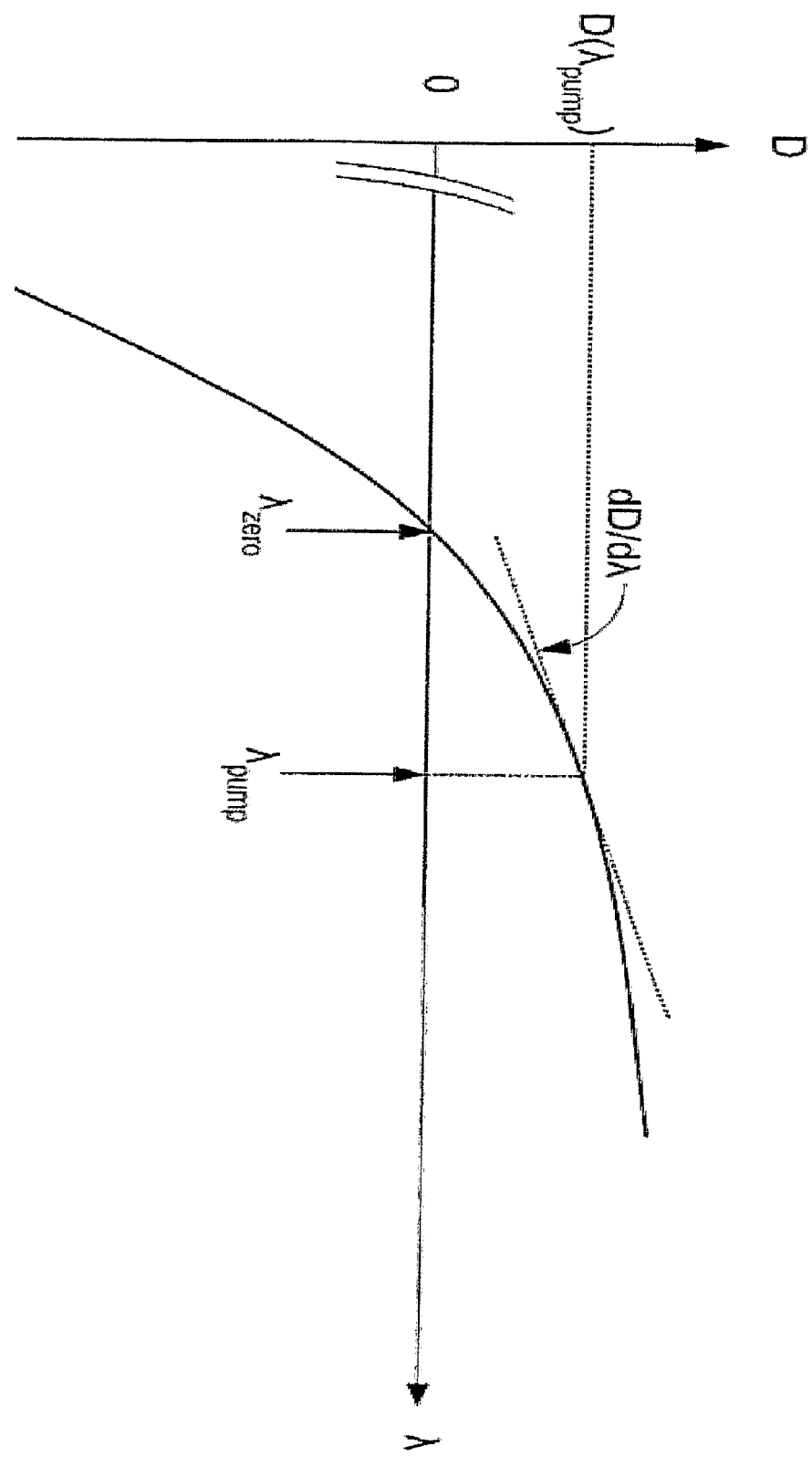
Figure 8C:
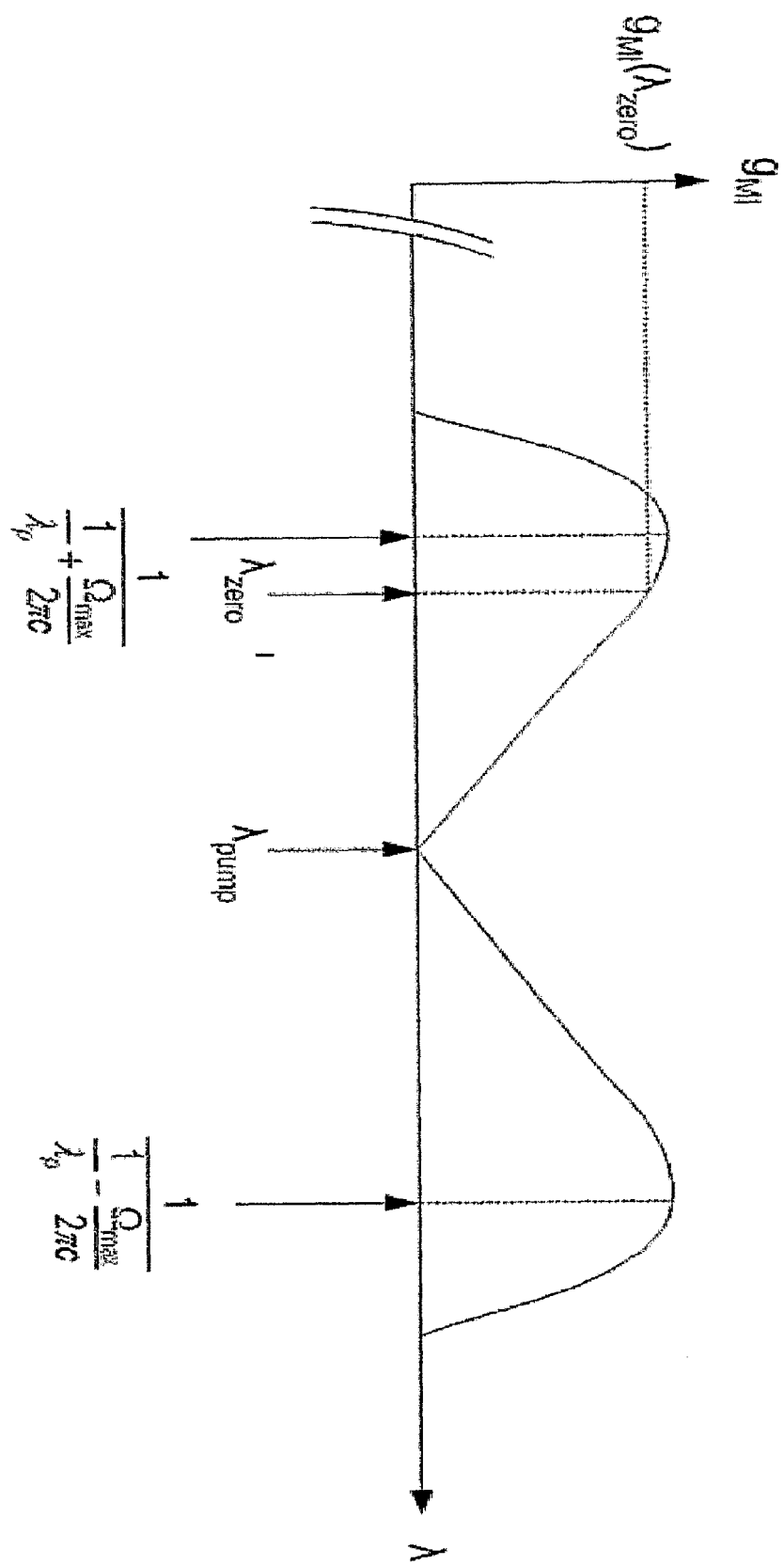

In this example the endlessly single mode condition is investigated with respect to choice of optimum excitation wavelength for a high repetition rate (≧1 MHz) pico second pump source (6 ps duration). In FIG. 7 the blue edge wavelength border is shown as function of pump wavelength for fibre designs which hold a zero dispersion wavelength 4 nm below the excitation wavelength and a d/Λ parameter equal to 0.45 (endlessly single mode). From the calculations in FIG. 7 it is to be expected that a maximum extension into the ultraviolet for an endlessly single mode fibre design with triangular hole cladding is to be found for pump wavelengths in the 1064 nm-1090 nm range.

Example 3

In this example it is assumed that a designer of a blue extended super continuum light source according to the invention has a specific light source available as a pump source. In this case a picosecond laser with a wavelength $\lambda_{pump}$=1064 nm, peak power $P_0$=23 kW, pulse width $T_0$=4.5 ps (corresponding full-width at half maximum of 8 ps). The designer sets out to provide a SC extending down to $\lambda_{low}$=450 nm. Furthermore, at his disposal the designer has a series of micro structured fibres but needs to find the most suitable. The fibres are made of silica and have a solid core with a cladding comprising holes in a triangular lattice with the following structural parameters:

| Pull | Λ | d/Λ |
|---|---|---|
| 1 | 2.42 | 0.46 |
| 4 | 1.81 | 0.45 |
| New | 3.5 | 0.5 |

The following is one example of how to approach the design process of achieving a light source according to the invention.

Using standard electromagnetic mode solvers (e.g. "MIT Photonic Bands", "COMSOL", or "CUDOS MOF") the designer calculates the propagation constant) β(ω) for each fibre.

He then applies that a phase match of the dispersive wave at shorter wavelengths (Cherenkov radiation) and the propagating solitons is required. Since the phase of an optical wave at frequency ω is given by φ=β(ω)z−ωt, we have:

$$\phi(\omega_d) = \beta(\omega_d)z - \omega_d(z/v_{g,sol})$$
$$\phi(\omega_{sol}) = \beta(\omega_{sol})z - \omega_{sol}(z/v_{g,sol}) + \frac{1}{2}\gamma P_{sol},$$

where subscripts "sol" designates a soliton, "d" designates the dispersive wave, and the time delay t was replaced by t=z/$v_{g,sol}$, and it was used that the soliton has a nonlinear phase shift contribution $$\frac{1}{2}\gamma P_{sol}$$

[Agrawal, Nonlinear Fiber Optics].

Using the Taylor expansion $$\beta(\omega_d) = \beta_0 + \beta_1[\omega_d - \omega_{sol}] + \frac{\beta_2}{2}[\omega_d - \omega_{sol}]^2 + \dots$$

where $\beta_1 = 1/v_{g,sol}$ and $\beta_m = \left(\frac{d^m\beta}{d\omega^m}\right)_{\omega=\omega_{sol}}$, setting φ($\omega_d$)=φ($\omega_{sol}$) results in $$\sum_{m=2}^{\infty} \frac{\beta_m}{m!}[\omega_d - \omega_{sol}]^m = \frac{1}{2}\gamma P_{sol} = \frac{1}{2}\frac{|\beta_2|}{T_0^2} \qquad (10)$$

corresponding to Eq. 7 where the relation $\gamma P_{sol}T_0^2$=|$\beta_2$| for a fundamental soliton was used. Based on the equation the phase match condition for each of the fibres may be calculated.

As in equation (5) the soliton power $P_{sol}$ is approximated with the launched input power and set to 23 kW.γ is calculated from Eq. (3), where $A_{eff}$ is approximated by the estimated core area where the core diameter is found as $d_{core}$=2Λ−d, and λ is set to the pump wavelength. For calculating γ a standard value of the $n_2$ parameter is estimated to 2.6·10$^{-20}$ m$^2$/W. Note that γ is inversely proportional to the wavelength, and therefore changes as the soliton red-shifts; however, for the frequency separations $\omega_d$−$\omega_{sol}$ used here, the contribution from the term containing γ is of little influence negligible. The solutions to Eq. (10) are plotted in FIG. 9.

Figure 9:
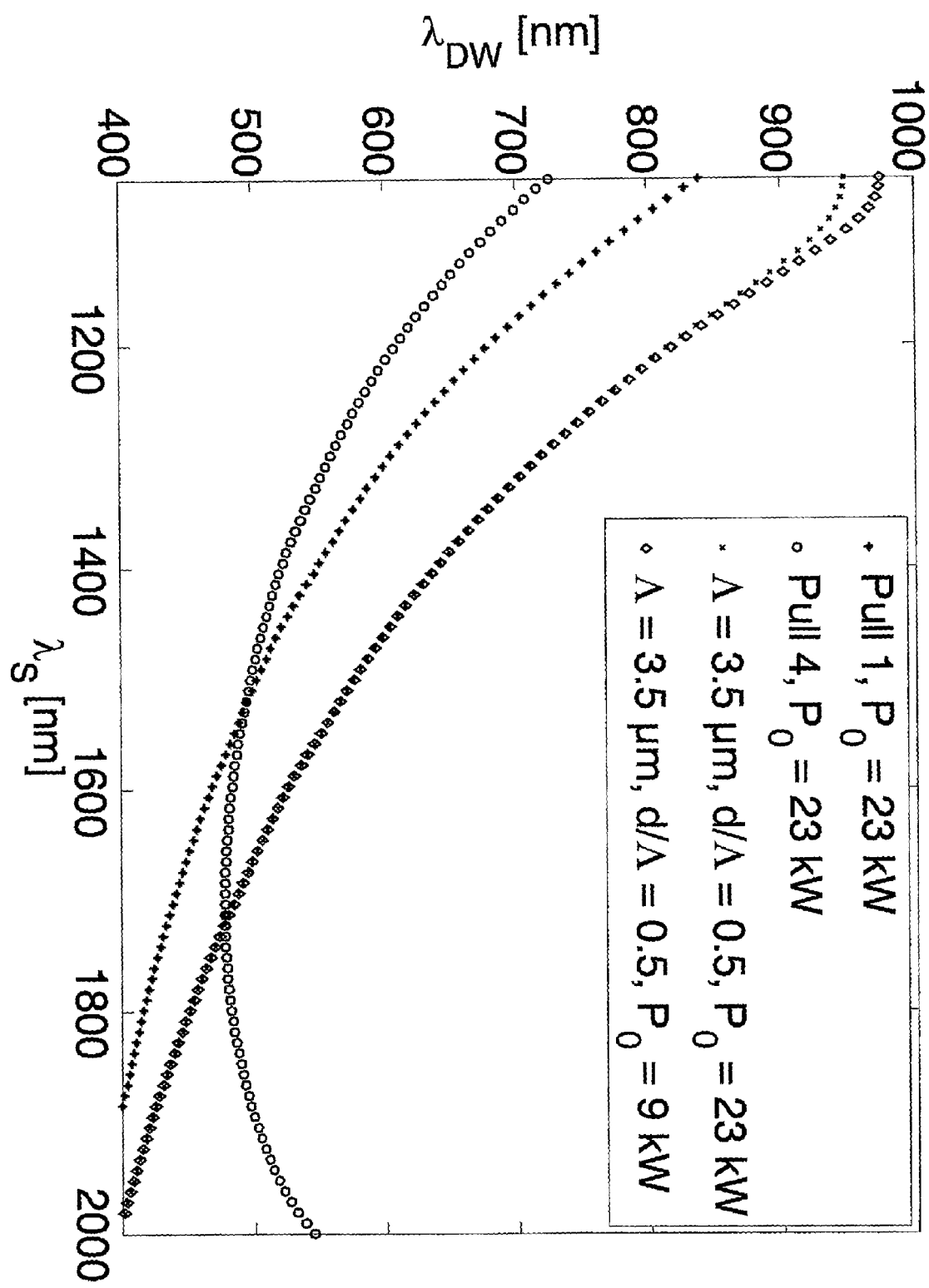
FIG. 9 shows a plot of the phase match for the generated dispersive wave (Cherenkow) and the wavelength of the raman soliton for the fibre of example 3.

From FIG. 9, it is seen that solitons in fibre "Pull 4" cannot achieve phase match to a dispersive wave below ~480 nm. Pull 4 can therefore not be used. Based on FIG. 9 the remaining fibres both appear useful for the purpose of generating light at 450 nm.

Figure 10:
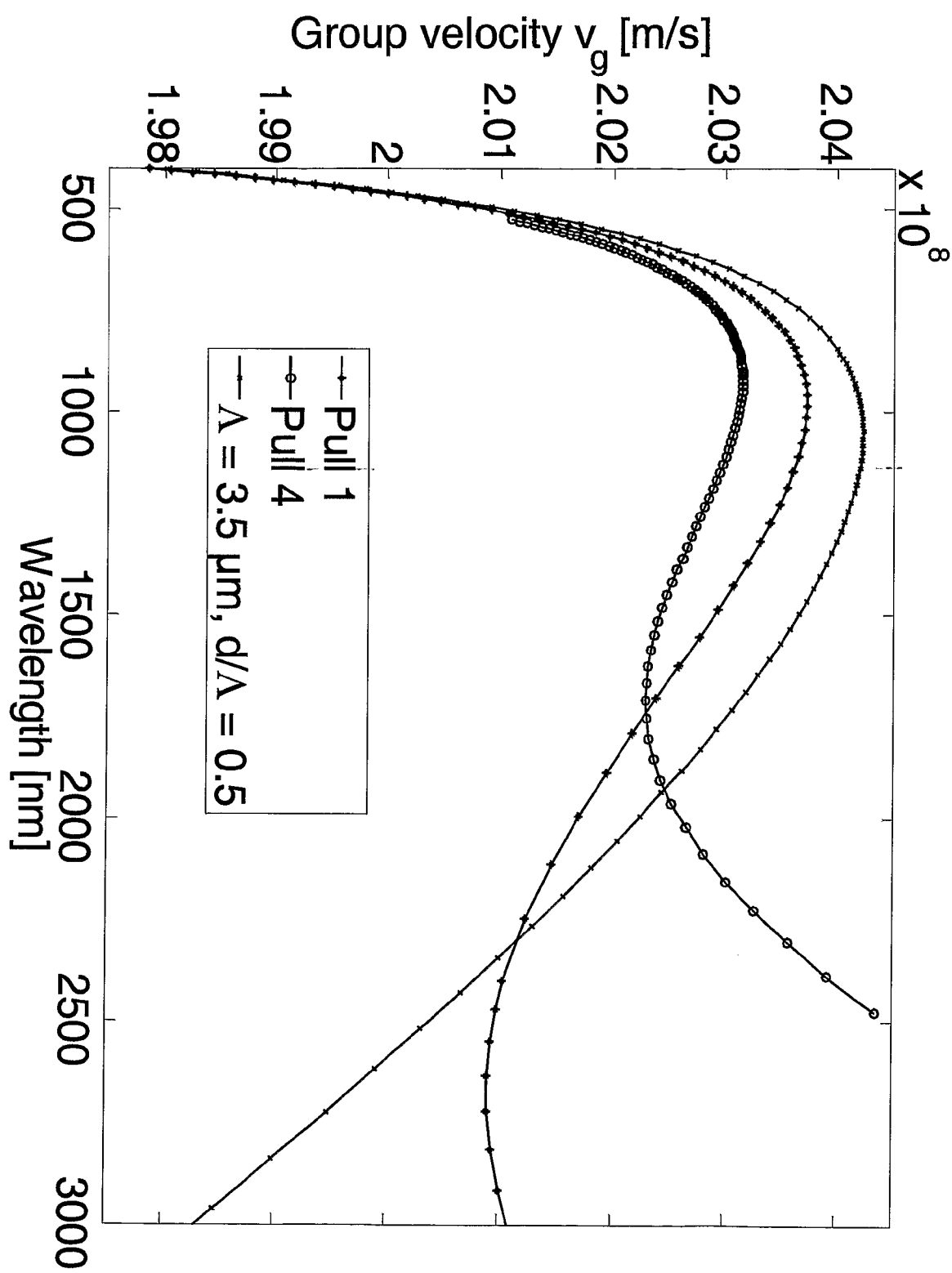
FIG. 10 shows a plot of the group velocity versus the wavelength for the fibre of example 3.

However, as discussed above, the group velocity of the red-shifting solitons must exceed the group velocity of the dispersive wave. The group velocity profiles may be calculated from the propagation constant as indicated from the above relations and are shown in the FIG. 10. It is seen that all of the investigated fibres meet the requirement of providing a larger group velocity for solitons above the pump wavelength 1064 nm than for the desired dispersive wave at 450 nm.

As discussed above it may be advantageous to extend the modulation instability gain to long wave lengths in order allow the solitons to redshift further and thereby couple energy to the desired short wavelengths. From Eq. (9) it is given that the gain is positive for $\Omega=\omega-\omega_{pump}$ satisfying $|\Omega|<\Omega_C$, where $\Omega_C=\sqrt{4\gamma P_0/|\beta_2|}$ and $\beta_2$ represents the group velocity dispersion at the pump wavelength.

For the fibres investigated here the maximum angular frequency shift ranges from 346 THz to 731 corresponding to about a wavelength of 1812 nm for the new design with $\Lambda=3.5$ µm and $d/\Lambda=0.5$, which then appears to be the most advantageous of the available fibres.

As discussed the above it is preferable that the pump pulse breaks up into THz repetition rate pulses. This occurrence may be investigated using Eq. 1 providing the repetition rate of the pulse train generated by modulation instability:

$$\Omega_{max}/(2\pi)=\Omega_C/(\sqrt{2}2\pi),$$

providing a repetition rate for the new design with $\Lambda=3.5$ µm and $d/\Lambda=0.5$ as 731 THz$/(\sqrt{2}2\pi)\approx 82$ THz.

Figure 11:
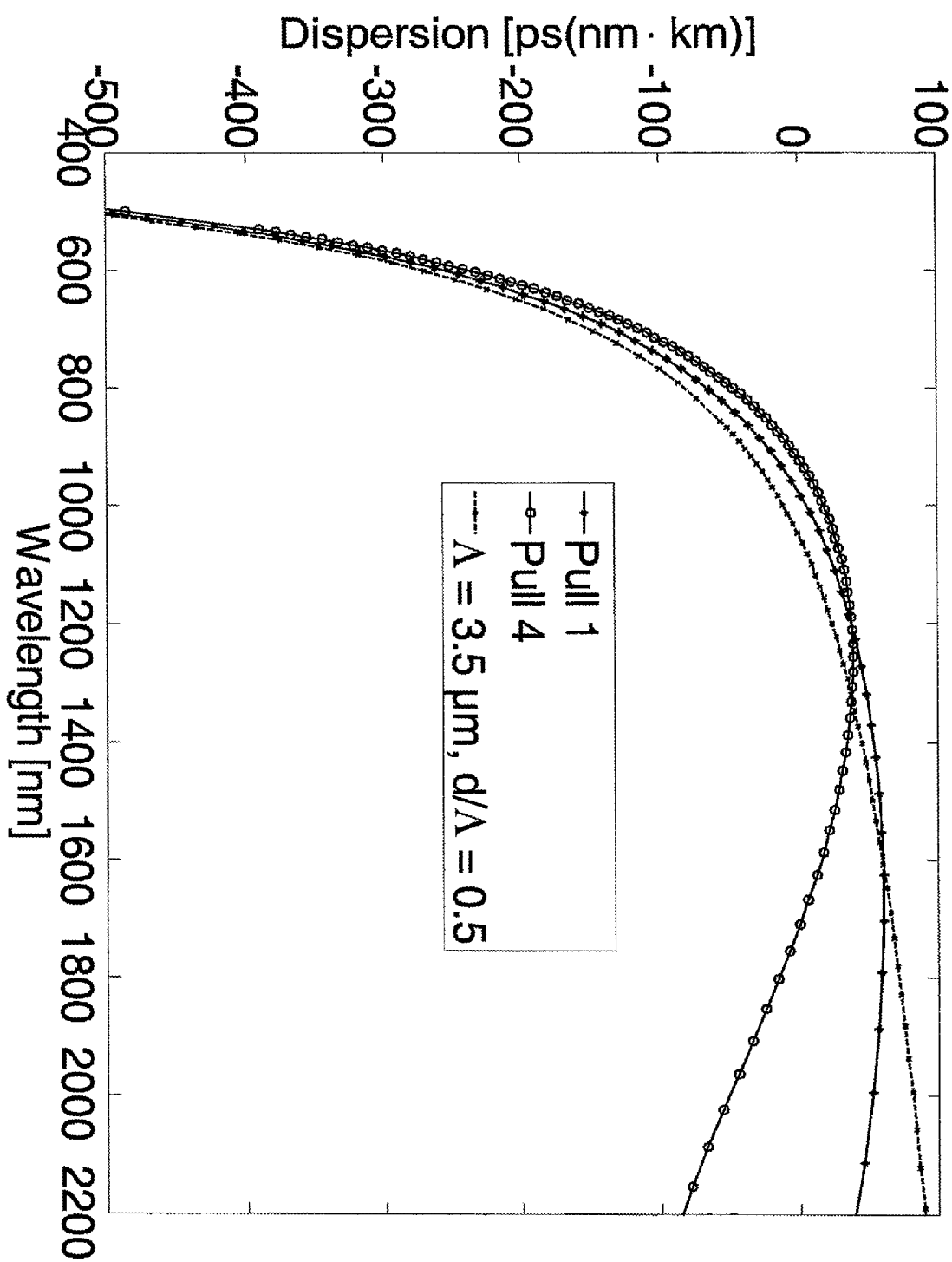
FIG. 11 shows a plot of the dispersion as a function of the wavelength for the fibre of example 3.

Finally, it may be advantageous to investigate the relation between the pump wavelength and the zero-dispersion wavelength. In this example the calculated dispersion profiles are shown in FIG. 11.

The two fibres with the smallest distance from the zero-dispersion wavelength to the pump wavelength are the new design with $\Lambda=3.5$ µm and $d/\Lambda=0.5$ (zero-dispersion at 1054 nm) and pull 1 (zero-dispersion at 978 nm).

The parameters of examples 1, 2 and 3 are first guess parameters. Optimal quasi-cw pulse parameters (wavelength, peak power and pulse duration) may preferably be determined by an optimization process, e.g. a trial and error-process for a given fibre design.

REFERENCES

1. J. Ranka, R. Windeler and A. Stentz, Optics Letters, Vol. 25, No. 1, 2000, pp. 25-27
2. J. Herrmann, U Griebner, N. Zhavoronkov, A. Husakou, D. Nickel, J. C. Knight, W. J. Wadsworth, P. St. J. Russell, and G. Korn, Phys. Rev. Letters, Vol. 88, No 17, 2002
3. S. Coen, A. H. L. Chau, R. Leonhardt, J. Harvey, J. C. Knitght, W. J. Wadsworth, and P. St. J. Russell, Optics Letters, Vol. 26, (2001), pp. 1356-1358
4. G. E. Town, T. Funaba, T. Ryan and K. Lyytikainen, Applied Physics B (Lasers and Optics), Vol. B77, No. 2-3, September 2003, pp. 235-238
5. Kudlinski, A. K. George, J. C. Knight, J. C. Travers, A. B. Rulkov, S. V. Popov, and J. R. Taylor, Optics Express, Vol. 14, No. 12, 12 Jun. 2006, pp. 5715-5722
6. EP 1502332 (JENOPTIK LASER OPTIK SYSTEME) Feb. 2, 2005
7. J. Price, W. Belardi, T. Monro, A. Malinowski, A. Piper, and D. Richardson, Optics Express Vol. 10, No. 8, Mar. 20, 2002, p. 382-387
8. D. V. Skryabin, F. Luan, J. C. Knight, P. St. J. Russell, Science, Vol. 30, 19 Sep. 2003, pp. 1705-1708
9. T. A. Birks, J. C. Knight, and P. St. J. Russell Endlessly single-mode photonic crystal fibre, Optics Letters, Vol. 22, 1997, pp. 961-963
10. Bjarklev, Broeng, and Bjarklev Photonic crystal fibres, Kluwer Academic Press, 2003
11. Andersen et al. A photonic crystal fiber with zero dispersion at 1064 nm, ECOC 2002, paper 3.4.2.
12. WO-02/12931 (CRYSTAL FIBRE) Feb. 14, 2002
13. WO-02/39159 (CRYSTAL FIBRE) May 16, 2002
14. WO-02/088801 (CRYSTAL FIBRE) Nov. 17, 2002
15. WO-02/084350 (CRYSTAL FIBRE) Oct. 24, 2002
16. WO-03/079074 (CRYSTAL FIBRE) Sep. 25, 2003
17. WO 00/49436 (UNIVERSITY OF BATH) Aug. 24, 2000
18. WO 2005/059612 (CRYSTAL FIBRE) Jun. 30, 2005

The invention claimed is:

1. A deep blue extended super continuum light source for generating a super continuum spectrum at least extending to a low wavelength border $\lambda_{low}$ below 480 nm with an intensity of the generated light $l(\lambda)>-10$ dBm/nm in a range of wavelengths $\lambda_{low}$ to $\lambda_{low}+50$ nm, said source comprising:
   a) a pump source arranged to pump a micro-structured optical transmission medium with pump pulses at at least one wavelength $\lambda_{pump}$ and duration (full width half maximum) longer than 1 picosecond with a repetition rate higher than 1 MHz, and a peak power $P_{peak}$, and
   b) said micro-structured optical transmission medium having at least one wavelength of zero dispersion $\lambda$zero, and for the parameters of said pump pulses arranged to exhibit:
      i) a second order dispersion parameter $\beta_2$, and a non-linear parameter $\gamma$ providing a modulation instability gain extending to wavelengths above a wavelength $\lambda_{high}>1300$ nm,
      ii) a phase match between self-frequency shifted solitons and wavelengths<480 nm, and
      iii) anomalous dispersion for said at least one wavelength $\lambda_{pump}$.

2. A deep blue extended super continuum light source according to claim 1 wherein the micro-structured optical transmission medium exhibit a group velocity at $\lambda_{match}$ equal to or larger than the group velocity at $\lambda_{low}$.

3. A deep blue extended super continuum light source according to claim 1 wherein $\lambda_{pump}$ relates to $\lambda_{zero}$ so that 100 nm $\geq(\lambda_{pump}-\lambda_{zero})\geq-10$ nm.

4. A deep blue extended super continuum light source according to claim 1 wherein said peak power, said second order dispersion parameter $\beta_2$, and said non-linear parameter $\gamma$, and said pump pulse duration, provides that at least a part of each of said pump pulses breaks into trains of Terahertz repetition rate pulses.

5. A deep blue extended super continuum light source according to claim 1 wherein said transmission medium is arranged so that at the parameters of the pump pulses the light source provides a super continuum spectrum with an intensity of at least part of the generated light $l(\lambda)\geq-10$ dBm/nm where $\lambda_{low}<\lambda<\lambda_{low}+200$ nm.

6. A deep blue extended super continuum light source according to claim 1 wherein said pulse duration is larger than 5 ps.

7. A deep blue extended super continuum light source according to claim 1 wherein $\lambda_{high}\geq 2200$ nm.

8. A deep blue extended super continuum light source according to claim 1 wherein said micro-structured optical transmission medium comprises a micro-structured optical fibre with a waveguide structure made from one or more of the group of silica, doped silica and polymer.

9. A deep blue extended super continuum light source according to claim 1 wherein said fibre comprises a solid core region extending along a longitudinal direction, and a cladding region surrounding the core region and extending along the longitudinal direction wherein said cladding region comprising at least one pattern of micro-structural elements, such as holes, separated by an average pitch $\Lambda$ and with a ratio of hole diameter d relative to the pitch in the range $0.2<d/\Lambda$.

10. A deep blue extended super continuum light source according to claim 1 wherein said micro-structured transmission medium holds a least one first zero dispersion wavelength below 1100 nm.

11. A deep blue extended super continuum light source according to claim 1 wherein said low wavelength border $\lambda_{low}$ is below 450 nm.

12. A deep blue extended super continuum light source according to claim 1 wherein said micro-structured transmission medium is arranged to support propagation of the wavelength $\lambda_{pump}$ in a single transverse mode.

13. A deep blue extended super continuum light source according to claim 1 wherein said micro-structured transmission medium is arranged so that all wavelengths in the generated supercontinuum spectrum propagates in a substantially single transverse mode.

14. A deep blue extended super continuum light source according to claim 1 wherein said micro-structured transmission medium is arranged to be polarization maintaining.

15. A deep blue extended super continuum light source according to claim 1 wherein the light source provides a super continuum spectrum with an intensity of at least part of the generated light $l(\lambda)$ being larger than 0 dBm/nm.

16. A deep blue extended super continuum light source according to claim 1 wherein the micro-structured optical transmission medium is arranged so within the fiber at least part of the light having a wavelength below $\lambda_{zero}$ interacts with part of the light having a wavelength equal to or longer than $\lambda_{zero}$ so the wavelength of said part of the light below $\lambda_{zero}$ is reduced.

17. A system selected from the group of a spectroscope, a confocal microscope, an ultra-short-pulse generator, a LIDAR, and an optical computer comprising a deep blue extended super continuum light source according to claim 1.

18. A deep blue extended super continuum light source according to claim 1, wherein with an intensity of the generated light $l(\lambda)>-5$ dBm/nm in a range of wavelengths $\lambda_{low}$ to $\lambda_{low}+50$ nm.

19. A deep blue extended super continuum light source according to claim 1, wherein with an intensity of the generated light $l(\lambda)>0$ dBm/nm in a range of wavelengths $\lambda_{low}$ to $\lambda_{low}+50$ nm.

20. A deep blue extended super continuum light source according to claim 1, wherein with an intensity of the generated light $l(\lambda)>3$ dBm/nm in a range of wavelengths $\lambda_{low}$ to $\lambda_{low}+50$ nm.

21. A deep blue extended super continuum light source according to claim 1 wherein said micro-structured optical fiber is arranged so that a phase match between self-frequency shifted solitons and a guided mode in the UV part of the spectrum exist.

22. A deep blue extended super continuum light source according to claim 1 wherein said micro-structured optical fiber is arranged so that a phase match between self-frequency shifted solitons and $\lambda_{low}$ exist.

23. A deep blue extended super continuum light source according to claim 1, wherein at least 4 rings of holes are placed around the solid core region.

24. A deep blue extended super continuum light source for generating a super continuum spectrum at least extending to a low wavelength border $\lambda_{low}$ below 480 nm with an intensity of the generated light $l(\lambda)>-10$ dBm/nm in a range of wavelengths $\lambda_{low}$ to $\lambda_{low}+50$ nm, said source comprising:

a) a pump source arranged to pump a micro-structured optical fiber with pump pulses at at least one wavelength $\lambda_{pump}$ and duration (full width half maximum) longer than 1 picosecond with a repetition rate higher than 1 MHz, and a peak power $P_{peak}$, and b) said micro-structured optical fiber having at least one wavelength of zero dispersion $\lambda_{zero}$, and for the parameters of said pump pulses arranged to:
i) exhibit a second order dispersion parameter $\beta_2$, and a non-linear parameter $\gamma$,
ii) generate self-frequency shifting solitons from the pump pulses;
iii) provide a phase match between-self-frequency shifted solitons and wavelengths<480 nm,
iv) exhibit anomalous dispersion for said wavelength $\lambda_{pump}$, wherein said micro-structured optical fiber comprises a solid core region extending along a longitudinal- direction, and a cladding region surrounding the core region and extending along the longitudinal direction wherein said cladding region comprising a pattern of micro-structural elements, such as holes, having a maximum cross-sectional dimension d and separated by an average pitch $\lambda$ arranged so that $d/\lambda>0.45$.

25. A deep blue extended super continuum light source according to claim 24, wherein Raman solitons create a dispersive wave.

26. A deep blue extended super continuum light source according to claim 24, wherein $\lambda_{pump}$ relates to $\lambda_{zero}$ so that $100 \text{ nm} \geq (\lambda_{pump} - \lambda_{zero}) \geq -10 \text{ nm}$.

27. A deep blue extended super continuum light source according to claim 24, wherein said peak power, said second order dispersion parameter $\beta_2$, and said non-linear parameter $\gamma$, and said pump pulse duration, provides that at least a part of each of said pump pulses breaks into trains of Terahertz repetition rate pulses.

28. A deep blue extended super continuum light source according to claim 24, wherein said fiber is arranged so that at the parameters of the pump pulses the light source provides a super continuum spectrum with an intensity of the generated light $l(\lambda) \geq -10$ dBm/nm in a range of wavelengths $\lambda_{low}$ to $\lambda_{low}+200$ nm.

29. A deep blue extended super continuum light source according to claim 24, wherein said pulse duration is larger than 5 ps.

30. A deep blue extended super continuum light source according to claim 24, wherein the generated self-frequency shifted solitons from the pump pulses self frequency shift to a wavelength beyond 2200 nm.

31. A deep blue extended super continuum light source according to claim 24, wherein said micro-structured optical fiber is made from one or more of the group of silica, doped silica and polymer.

32. A deep blue extended super continuum light source according to claim 24, wherein said micro-structured fiber holds a least one first zero dispersion wavelength below 1100 nm.

33. A deep blue extended super continuum light source according to claim 24, wherein said low wavelength border $\lambda_{low}$ is below 425 nm.

34. A deep blue extended super continuum light source according to claim 24, wherein said micro-structured fiber is arranged to support propagation of the wavelength $\lambda_{pump}$ in a single transverse mode.

35. A deep blue extended super continuum light source according to claim 24, wherein said micro-structured fiber is arranged to be polarization maintaining.

36. A deep blue extended super continuum light source according to claim 24, wherein the light source provides a super continuum spectrum with an intensity of at least 0 dBm/nm in a range of wavelengths from $\lambda_{low}$ to $\lambda_{low}+200$ nm.

37. A deep blue extended super continuum light source according to claim 24, wherein the micro-structured optical fiber is arranged so within the fiber at least part of the light having a wavelength below $\lambda_{zero}$ interacts with part of the light having a wavelength equal to or longer than $\lambda_{zero}$ so the wavelength of said part of the light below $\lambda_{zero}$ is reduced.

38. A system selected from the group of a spectroscope, a confocal microscope, an ultra-short-pulse generator, a LIDAR, and an optical computer comprising a deep blue extended super continuum light source according to claim 24.

39. A deep blue extended super continuum light source according to claim 24, wherein said micro-structured optical fiber and pump source are arranged to provide a modulation instability gain extending to wavelengths above a wavelength $\lambda_{high} \geq 1100$ nm.

40. A deep blue extended super continuum light source according to claim 39, where micro-structured optical fiber and pump source are arranged to provide a phase match between wavelengths below 480 nm and Raman solitons beyond 2000 nm.

41. A deep blue extended super continuum light source according to claim 24, wherein said low wavelength border $\lambda_{low}$ is below 450 nm.

42. A deep blue extended super continuum light source according to claim 24, wherein said d/Λ is larger than 0.47.

43. A deep blue extended blue continuum light source according to claim 24, wherein said d/Λ is larger than 0.49.

44. A deep blue extended super continuum light source according to claim 28, wherein said low wavelength border $\lambda_{low}$ is below 425 nm.

45. A deep blue extended super continuum light source according to claims 44, wherein $\lambda_{low}$ is smallest wavelength of the generated spectrum having a spectral density larger than −10 dBm/nm.

46. A deep blue extended super continuum light source according to claim 24, wherein said micro-structured optical fiber and pump source are arranged to provide a modulation instability gain extending to wavelengths above a wavelength $\lambda_{high} \geq 1300$ nm.

47. A deep blue extended super continuum light source according to claim 24, wherein the pump wavelength λpump is within the region of anomalous dispersion of the micro-structured optical fiber in a distance to the zero dispersion wavelength λzero which exceed 1 nm and not exceeds 20 nm.

48. A deep blue extended super continuum light source according to claim 24, wherein at least 4 rings of holes are placed around the solid core region.

49. A deep blue extended super continuum light source according to claim 24, wherein with an intensity of the generated light $l(\lambda) > -5$ dBm/nm in a range of wavelengths $\lambda_{low}$ to $\lambda_{low}+50$ nm.

50. A deep blue extended super continuum light source according to claim 24, wherein with an intensity of the generated light $l(\lambda) > 0$ dBm/nm in a range of wavelengths $\lambda_{low}$ to $\lambda_{low}+50$ nm.

51. A deep blue extended super continuum light source according to claim 24, wherein with an intensity of the generated light $l(\lambda) > 3$ dBm/nm in a range of wavelengths $\lambda_{low}$ to $\lambda_{low}+50$ nm.

* * * * *